United States Patent
Ikehashi

(10) Patent No.: US 10,767,992 B2
(45) Date of Patent: Sep. 8, 2020

(54) GYRO SENSOR SYSTEM

(71) Applicant: KABUSHIKI KAISHA TOSHIBA, Minato-ku, Tokyo (JP)

(72) Inventor: Tamio Ikehashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 170 days.

(21) Appl. No.: 15/705,229

(22) Filed: Sep. 14, 2017

(65) Prior Publication Data
US 2018/0274923 A1    Sep. 27, 2018

(30) Foreign Application Priority Data
Mar. 24, 2017    (JP) .................................. 2017-059892

(51) Int. Cl.
G01C 19/5719    (2012.01)
G01C 19/5726    (2012.01)
G01C 19/5762    (2012.01)

(52) U.S. Cl.
CPC ..... G01C 19/5726 (2013.01); G01C 19/5762 (2013.01)

(58) Field of Classification Search
CPC ............ G01C 19/5719; G01C 19/5726; G01C 19/5755; G01C 19/5762; G01C 19/5776
See application file for complete search history.

(56) References Cited

U.S. PATENT DOCUMENTS

| 7,565,839 B2 | 7/2009 | Stewart et al. |
| 8,087,295 B2 | 1/2012 | Netzer |
| 2004/0112133 A1* | 6/2004 | Glenn .................. B81B 3/0051 |
| | | 73/504.12 |

(Continued)

FOREIGN PATENT DOCUMENTS

| JP | 2009-530603 A | 8/2009 |
| JP | 5161440 B2 | 3/2013 |
| JP | 2016-200512 A | 12/2016 |

OTHER PUBLICATIONS

Ni, Yunfang et al., "Design and Application of Quadrature Compensation Patterns in Bulk Silicon Micro-Gyroscopes", Sensors 2014 (vol. 14, No. 11) Oct. 29, 2014, pp. 20419-20438.

(Continued)

*Primary Examiner* — Jill E Culler
*Assistant Examiner* — Ruben C Parco, Jr.
(74) *Attorney, Agent, or Firm* — Foley & Lardner LLP

(57) ABSTRACT

According to one embodiment, a gyro sensor system including a gyro sensor unit is disclosed. The unit includes a movable body, a spring mechanism, a detector, an adjuster, and a rotation angle acquisition unit. The spring mechanism vibrates the movable body. A detector detects an amplitude of vibration of the movable body due to Coriolis force. The adjuster adjusts a first resonance frequency of vibration of the movable body in free vibration and a second resonance frequency of vibration of the movable body due to Coriolis force on the movable body so that the first and second resonance frequencies are to coincide with each other based on the amplitude of the vibration due to Coriolis force. The rotation angle acquisition unit acquires a rotation angle of the movable body, based on the amplitude of the vibration due to Coriolis force.

13 Claims, 14 Drawing Sheets

(56) References Cited

U.S. PATENT DOCUMENTS

2012/0191396 A1* 7/2012 Griffith .................. G01C 19/62
702/92
2015/0377621 A1* 12/2015 Chaumet ............ G01C 19/5747
73/504.16
2016/0298966 A1 10/2016 Ikehashi

OTHER PUBLICATIONS

Prikhodko, Igor P. et al., "Foucault Pendulum on a Chip: Angle Measuring Silicon MEMS Gyroscope", 2011 IEEE 24th International Conference on Micro Electro Mechanical Systems (MEMS 2011), Jan. 23-27, 2011, pp. 161-164.

* cited by examiner

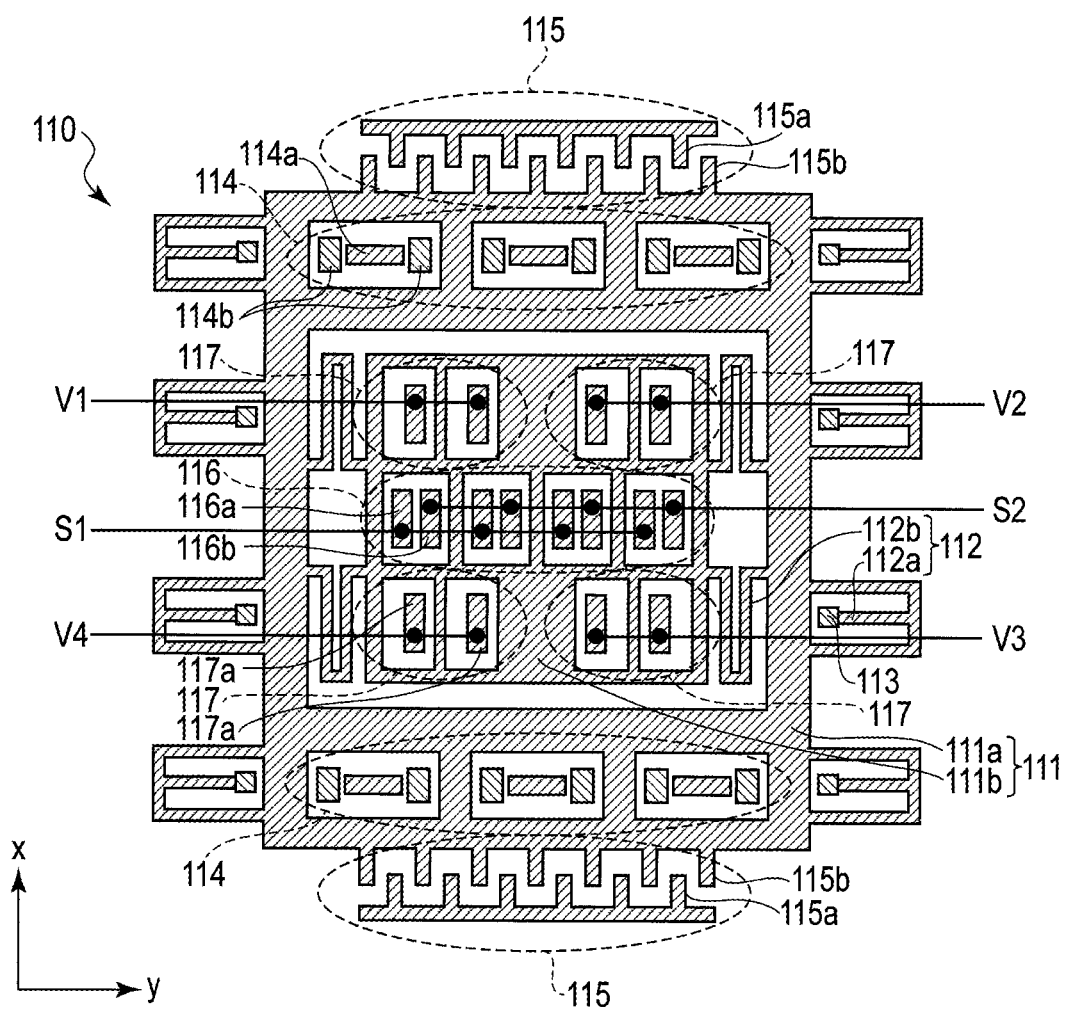
F I G. 2

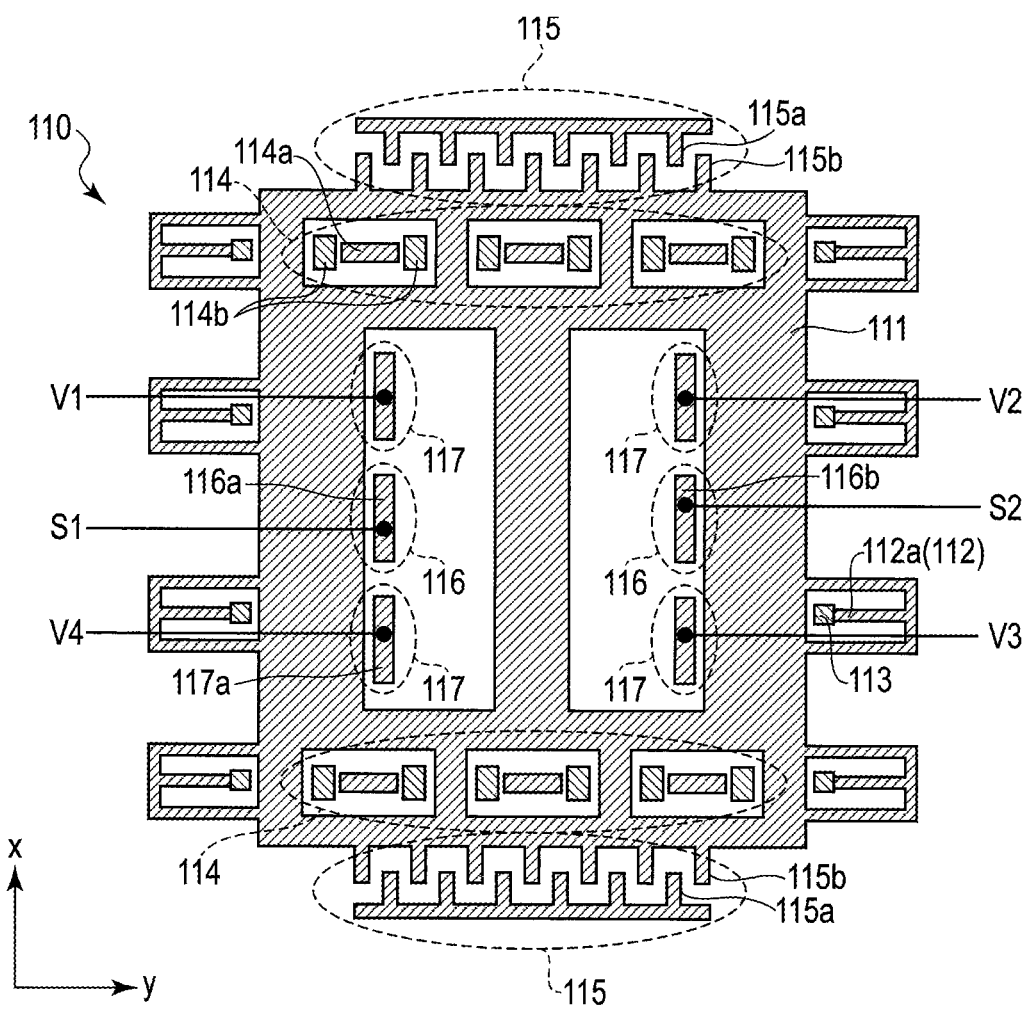
F I G. 3

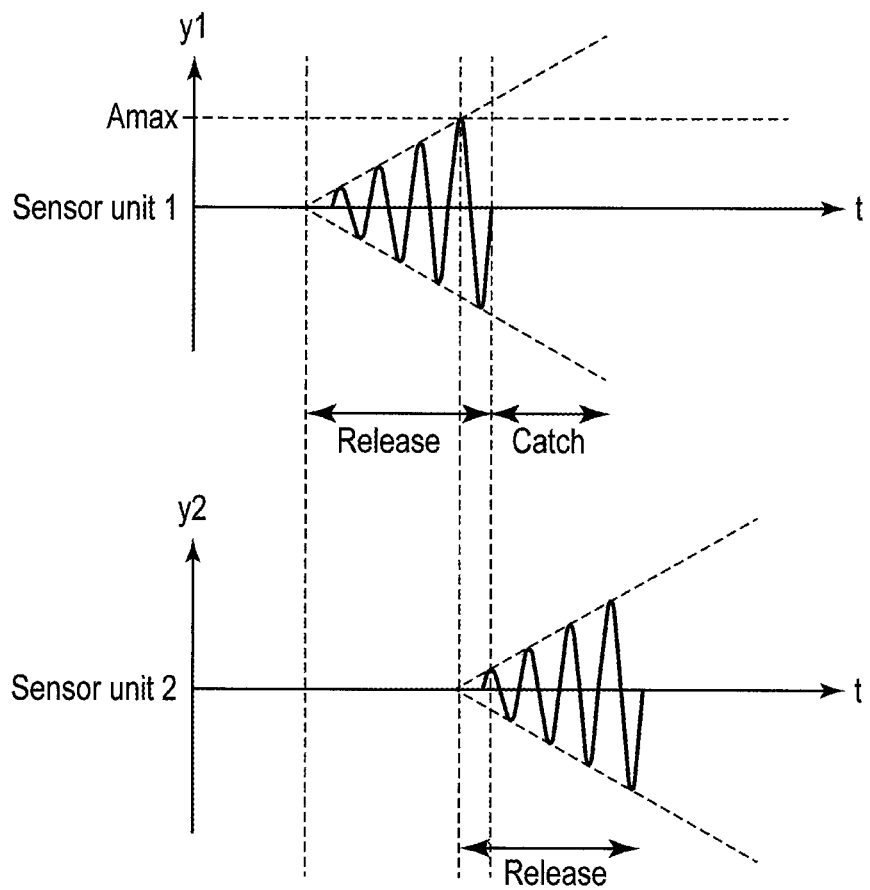
F I G. 11
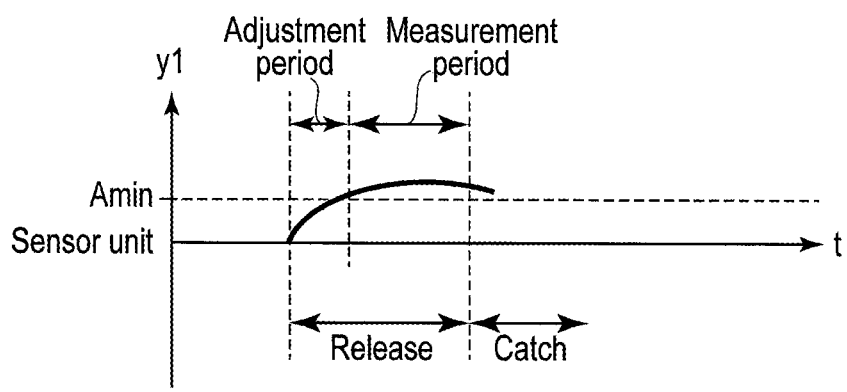
F I G. 12

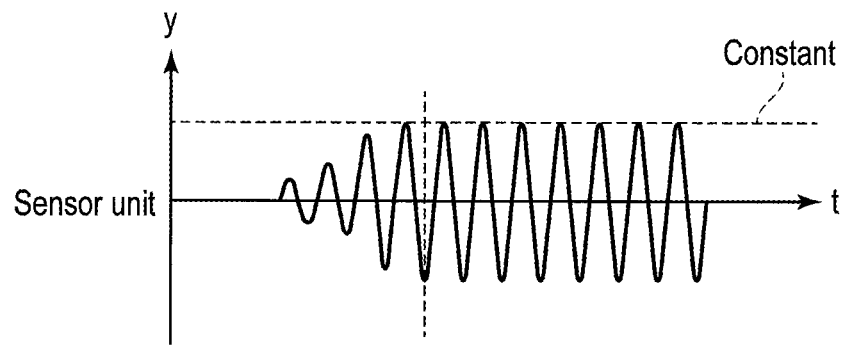
F I G. 15
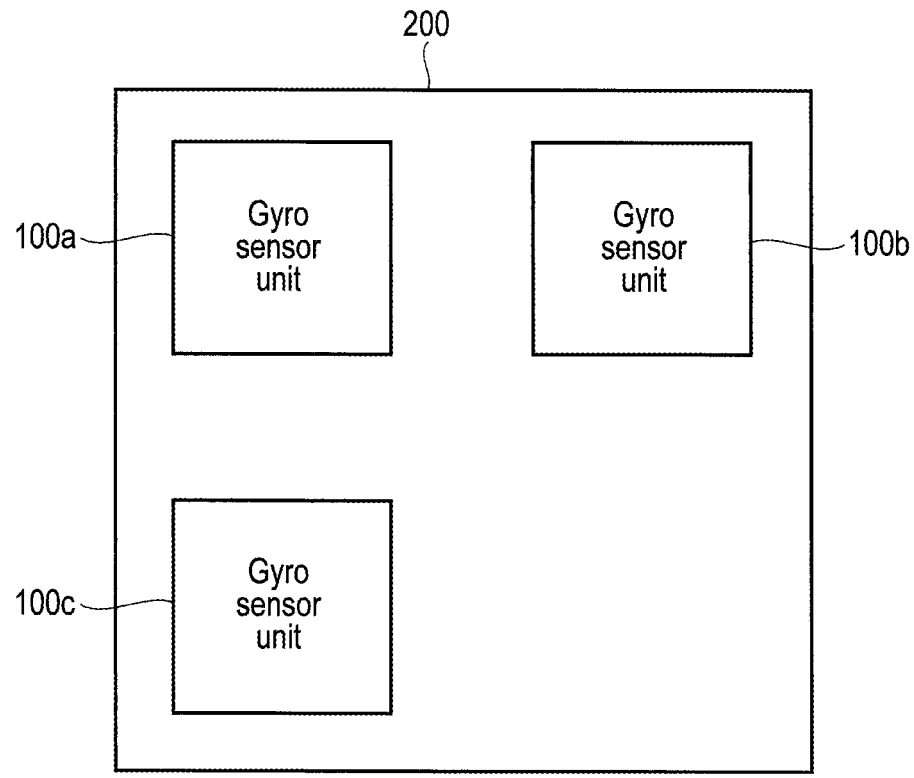
F I G. 16

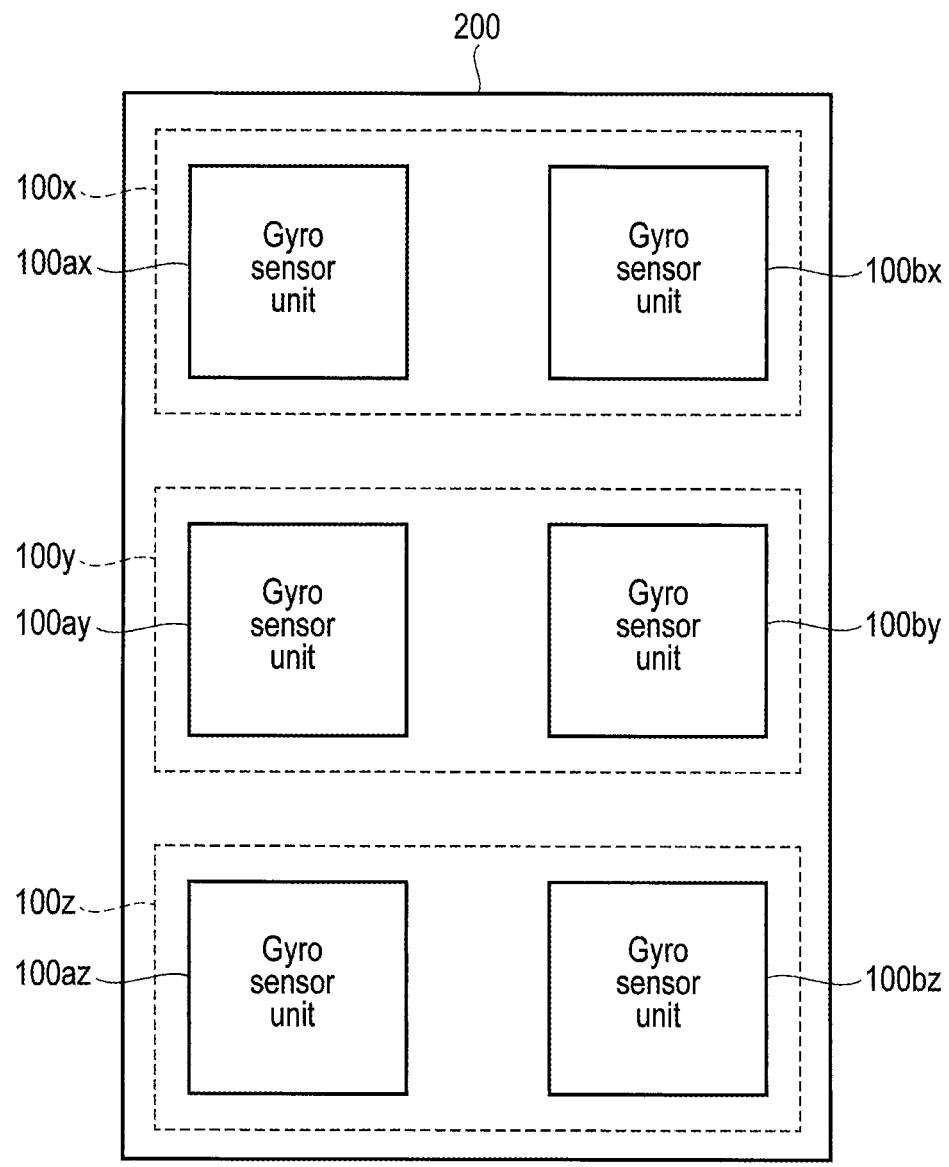
F I G. 17

GYRO SENSOR SYSTEM

CROSS-REFERENCE TO RELATED APPLICATIONS

This application is based upon and claims the benefit of priority from Japanese Patent Application No. 2017-059892, filed Mar. 24, 2017, the entire contents of which are incorporated herein by reference.

FIELD

Embodiments described herein relate generally to a gyro sensor system.

BACKGROUND

When an attempt to detect an angle by using a gyro sensor is performed, normally, angular velocities detected by the gyro sensor are integrated. For this reason, there may be a case in which sufficient angle detection accuracy is not obtained.

The angle can be directly detected by means of the gyro sensor. In this case, however, there are not only various restrictions, but also is difficulty in performing the angle detection with high accuracy.

BRIEF DESCRIPTION OF THE DRAWINGS

FIG. 2 is a plan view schematically showing a configuration of a gyro element in the gyro sensor system according to the embodiment.

FIG. 3 is a plan view schematically showing a configuration of a modified example of the gyro element in the gyro sensor system according to the embodiment.

FIG. 11 is a diagram showing a first operation example of the gyro sensor system according to the embodiment.

FIG. 12 is a diagram showing a second operation example of the gyro sensor system according to the embodiment.

FIG. 15 is a diagram showing a fourth operation example of the gyro sensor system according to the embodiment.

FIG. 16 is a diagram showing a basic configuration (concept) of a gyro sensor system according to a second modified example of the embodiment.

FIG. 17 is a diagram showing a basic configuration (concept) of a gyro sensor system according to a third modified example of the embodiment.

DETAILED DESCRIPTION

In general, according to one embodiment, a gyro sensor system including at least one gyro sensor unit is disclosed. The unit includes a movable body, a spring mechanism, a detector, an adjuster and a rotation angle acquisition unit. The spring mechanism vibrates the movable body. The detector detects an amplitude of vibration of the movable body wherein the vibration is due to a Coriolis force acting on the movable body. The adjuster adjusts a first resonance frequency of vibration of the movable body in free vibration and a second resonance frequency of vibration of the movable body wherein the vibration is due to the Coriolis force acting on the movable body so that the first resonance frequency and the second resonance frequency are to coincide with each other, based on the amplitude of the vibration due to the Coriolis force detected by the detector. The rotation angle acquisition unit acquires a rotation angle of the movable body, based on the amplitude of the vibration due to the Coriolis force detected by the detector in a state in which the first resonance frequency and the second resonance frequency are adjusted by the adjuster so that the first resonance frequency and the second resonance frequency are to coincide with each other.

Hereinafter, embodiments will be described with reference to the accompanying drawings.

Figure 1:
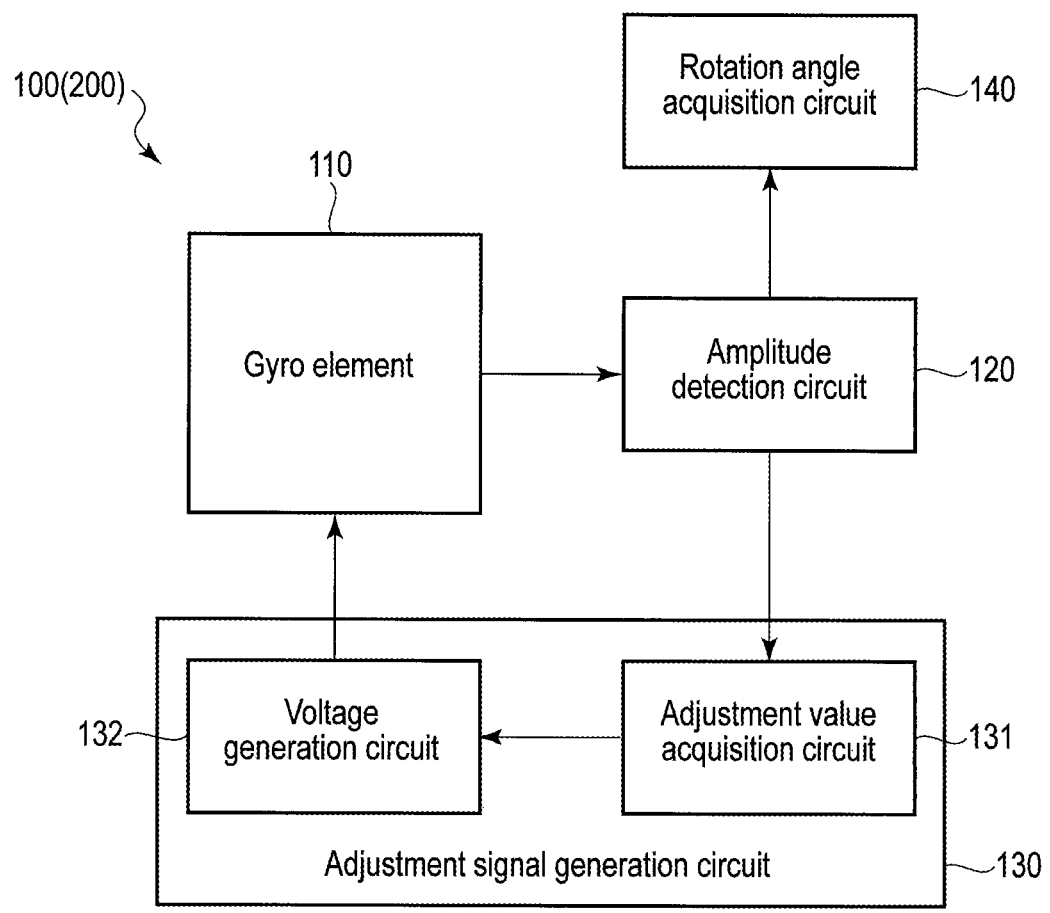
FIG. 1 is a block diagram showing a basic configuration of a gyro sensor system according to an embodiment.

FIG. 1 is a block diagram showing a basic configuration of a gyro sensor system according to an embodiment.

FIG. 2 is a plan view schematically showing a configuration of a gyro element in the gyro sensor system (gyro sensor unit) according to the embodiment. The gyro element is formed on a substrate by means of a micro-electromechanical systems (MEMS) technology.

As shown in FIG. 1, a gyro sensor system 200 (gyro sensor unit 100) comprises a gyro element (MEMS element) 110, an amplitude detection circuit 120, an adjustment signal generation circuit 130, and a rotation angle acquisition circuit 140.

As shown in FIG. 2, the gyro element (MEMS element) 110 includes a movable body 111, a spring mechanism 112, an anchor 113, a catch and release mechanism 114, a drive and monitor mechanism 115, a detection mechanism 116, and an adjustment mechanism 117.

The movable body 111 includes a movable portion (movable mass) 111a and a movable portion (movable mass) 111b, and can be vibrated in an x direction (first direction) and a y direction (second direction) perpendicular to the x direction. The movable portion 111a is a movable portion for drive and can be mainly vibrated in the x direction (first direction). The movable portion 111b is a movable portion for sense and can be mainly vibrated in the y direction (second direction). As shown in FIG. 2, the movable body 111 has an x-direction pattern and a y-direction pattern that are different from each other. In the more strict sense, when the movable body 111 is rotated by 90° with respect to an axis that is perpendicular to the x direction and the y direction and passes through a center of the pattern of the movable body 111, the pattern of the movable body 111 before the movable body 111 is rotated and the pattern of the movable body 111 after the movable body 111 is rotated do not coincide with each other.

The spring mechanism 112 includes a spring portion 112a and a spring portion 112b and vibrates the movable body 111 in the x and y directions. The spring portion 112a is connected to the movable portion 111a and is provided to mainly vibrate the movable portion 111a in the x direction. The spring portion 112b is connected to the movable portion 111a and the movable portion 111b and is provided to mainly vibrate the movable portion 111b in the y direction. In the example shown in FIG. 2, the spring mechanism 112 includes eight spring portions 112a and four spring portions 112b. If a rotational motion is applied to the movable body 111 that is in free vibration in the x direction by the spring mechanism 112, a Coriolis force acts on the movable body 111, such that the movable body 111 is vibrated in the y direction.

The anchor 113 is provided to support the spring portion 112a and is fixed to an underlying area. In the example shown in FIG. 2, eight anchors 113 are provided corresponding to the eight spring portions 112a.

The catch and release mechanism 114 serves to catch the movable body 111 and release the caught movable body 111 to set the movable body 111 in the free vibration in the x direction. The catch and release mechanism 114 includes an electrode portion 114a and a stopper portion 114b. An electrostatic attraction is applied between the electrode portion 114a and the movable body 111 by applying a predetermined voltage between the electrode portion 114a and the movable body 111. As a result, the movable body 111 stops with being in contact with the stopper portion 114b and the movable body 111 is caught by the catch and release mechanism 114. The voltage applied between the electrode portion 114a and the movable body 111 is lower to reduced the electrostatic attraction, thereby releasing the movable body 111 from the catch and release mechanism 114, and thus the movable body 111 starts free vibration in the x direction.

The drive and monitor mechanism 115 includes an electrode portion 115a and an electrode portion 115b and has a drive function and a monitor function for the movable body 111. The drive function serves to forcibly drive the movable body 111 in an initial state immediately after turning on a power supply of the gyro sensor system. That is, the movable body 111 is not caught by the catch and release mechanism 114 in the initial state immediately after turning on the power supply. In such an initial state, the electrostatic attraction is applied between the electrode portion 115a and the electrode portion 115b by applying a predetermined voltage between the electrode portion 115a and the electrode portion 115b. As a result, the movable body 111 is driven, such that the movable body 111 can be caught by the catch and release mechanism 114. The monitor function serves to monitor an x-direction position of the movable body 111 that is vibrating in the x direction. The x-direction position of the movable body 111 can be monitored by detecting a capacitance between the electrode portion 115a and the electrode portion 115b. In the example shown in FIG. 2, two drive and monitor mechanisms 115 are provided, in which one drive and monitor mechanism 115 can be used for drive and the other drive and monitor mechanism 115 can be used for monitor.

A detection portion including the detection mechanism 116 and the amplitude detection circuit 120 (see FIG. 1) detects amplitude of the vibration in the y direction of the movable body 111 based on the Coriolis force acting on the movable body 111 that is in the free vibration in the x direction by the spring mechanism 112. Hereinafter, the detection mechanism 116 and the amplitude detection circuit 120 will be further described.

The detection mechanism 116 detects a predetermined physical quantity based on amplitude of the vibration in the y direction of the movable body 111 and includes an electrode portion 116a and an electrode portion 116b. In the present embodiment, the predetermined physical quantity is a physical quantity that is based on a capacitance Ca between the electrode portion 116a and the movable body 111, and a capacitance Cb between the electrode portion 116b and the movable body 111. As described above, if the rotational motion is applied to the movable body 111 that is in the free vibration in the x direction, the Coriolis force acts on the movable body 111, such that the movable body 111 is vibrated in the y direction. As a result, the above-described capacitances Ca and Cb are changed in accordance with the vibration. Since the electrode portions 116a and 116b are fixed to the underlying area, if one of the capacitances Ca and Cb is increased due to the vibration of the movable body 111 in the y direction, the other of the capacitances Ca and Cb is decreased.

The amplitude detection circuit 120 shown in FIG. 1 is connected to the electrode portions 116a and 116b of the detection mechanism 116. The amplitude detection circuit 120 detects the amplitude of the vibration in the y direction of the movable body 111 based on the predetermined physical quantity (capacitances Ca and Cb) detected by the detection mechanism 116. As described above, if one of the capacitances Ca and Cb is increased, the other one of the capacitances Ca and Cb is decreased. Therefore, the amplitude detection circuit 120 can detect the amplitude of the vibration in the y direction of the movable body 111 based on a difference between the capacitance Ca and the capacitance Cb.

An adjustment portion including the adjustment mechanism 117 and the adjustment signal generation circuit 130 (see FIG. 1) performs predetermined adjustment based on the amplitude of the vibration in the y direction of the movable body 111 detected by the detection portion (the detection mechanism 116 and the amplitude detection circuit 120). Specifically, as will be described later, the adjustment portion performs the predetermined adjustment so that a resonance frequency (first resonance frequency) of the vibration in the x direction of the movable body 111 coincides with that (second resonance frequency) of the vibration in the y direction of the movable body 111. Hereinafter, the adjustment mechanism 117 and the adjustment signal generation circuit 130 will be further described.

The adjustment signal generation circuit 130 generates the adjustment signal to coincide the first resonance frequency and the second resonance frequency with each other, based on the amplitude of the vibration in the y direction of the movable body 111 detected by the detection portion (detection mechanism 116 and amplitude detection circuit 120). Specifically, amplitude information from the amplitude detection circuit 120 is input to an adjustment value acquisition circuit 131. The adjustment value acquisition circuit 131 calculates an adjustment value (correction value) based on the amplitude information, and acquires the adjustment value. The adjustment value information from the adjustment value acquisition circuit 131 is input to the voltage generation circuit 132 and a voltage for coinciding the first resonance frequency and the second resonance frequency with each other is generated.

The adjustment mechanism 117 receives the adjustment signal generated from the adjustment signal generation circuit 130 to perform the predetermined adjustment on the movable body 111. Specifically, the voltage generated from the voltage generation circuit 132 is applied to an electrode portion 117a of the adjustment mechanism 117 as the adjustment signal. A voltage signal (adjustment signal) generated from the voltage generation circuit 132 is applied to the adjustment mechanism 117 to adjust a direction (angle in an xy plane) of the movable portion 111b of the movable body 111 with respect to the movable portion 111a, such that the first resonance frequency and the second resonance frequency can coincide with each other. In the example shown in FIG. 2, four adjustment mechanisms 117 are included in the gyro element 110, and voltages V1, V2, V3, and V4 are respectively applied to the four adjusting mechanisms 117.

The rotation angle acquisition circuit (rotation angle acquisition portion) 140 acquires (calculates) a rotation angle of the movable body 111, based on the amplitude of the vibration in the y direction of the movable body 111 that is detected in a state in which the adjustment portion (adjustment mechanism 117 and adjustment signal generation circuit 130) adjusts the first resonance frequency and the second resonance frequency so that the first resonance frequency and the second resonance frequency coincide with each other. As will be described later, the amplitude of the vibration in the y direction of the movable body 111 is detected in the state in which the first resonance frequency and the second resonance frequency are adjusted so that the first resonance frequency and the second resonance frequency coincide with each other, thereby capable of directly acquiring the rotation angle of the movable body 111.

FIG. 3 is a plan view schematically showing a modified example of the configuration of the gyro element in the gyro sensor system (gyro sensor unit) according to the embodiment. Since a basic configuration of the gyro element of the present modified example is similar to the configuration of the gyro element shown in FIG. 2, the description of the items already described will be omitted.

In the gyro element (MEMS element) 110 shown in FIG. 2, the movable body (movable mass) 111 mainly includes the movable portion 111a which can be mainly vibrated in the x direction and the movable portion 111b which can be mainly vibrated in the y direction. As shown in FIG. 3, a gyro element (MEMS element) 110 of the present modified example has a movable body (movable mass) 111 in which a movable portion vibrated in an x direction and a movable portion vibrated in a y direction are integrated. For this reason, even a spring mechanism 112 includes only a spring portion 112a. In addition, even positions of a detection mechanism 116 (electrode portions 116a and 116b) and an adjustment mechanism (electrode portion 117a) 117 are different from those in the case of FIG. 2.

The basic functions and operations of the gyro element 110 of the present modified example are the same as those of the gyro element 110 shown in FIG. 2. Therefore, by applying the gyro element 110 of the present modified example to the gyro sensor system 200 (gyro sensor unit 100) shown in FIG. 1, it is possible to perform the same operations as in the above embodiment.

Next, the principle of the gyro sensor system according to the present embodiment will be described.

A gyro sensor capable of directly detecting a rotation angle is based on the principle of the Foucault pendulum. A movable body (mass) that is held by a spring mechanism and can be vibrated in x and y directions is assumed. It is assumed that a resonance frequency in the x direction and a resonance frequency in the y direction are equal to each other and an angular resonance frequency is $\omega$.

In the system as described above, equations of the motion when the movable body (mass) is rotating at an angular velocity $\Omega(t)$ are expressed as follows.

$$\ddot{x}+\omega^2 x = 2\Omega(t)\dot{y}$$

$$\ddot{y}+\omega^2 y = -2\Omega(t)\dot{x}$$

The right sides of the above formulas represent contributions of the Coriolis force.

Initial Condition

A solution satisfying the initial condition
$x(0)=A$
$\dot{x}(0)=0$
$y(0)=0$
$\dot{y}(0)=0$
is as follows.

$$\begin{pmatrix} x \\ y \end{pmatrix} = \begin{pmatrix} \cos\Phi & \sin\Phi \\ -\sin\Phi & \cos\Phi \end{pmatrix} \begin{pmatrix} A\cos\omega t \\ Ar\sin\omega t \end{pmatrix}$$

Where $\Phi(t)$ and r are as follows.

$$\Phi(t) = \int_0^t dt' \Omega(t')$$

$$r \equiv \frac{\Omega(0)}{\omega}$$

$\Phi$ is obtained by integrating an angular velocity $\Omega$, that is, an angle.

Therefore, a rotation angle in an xy plane of the movable body (mass) that is in the free vibration is obtained by the following formula, $$\Phi = \tan^{-1}\left[-\frac{y}{x}\right]$$

the angle $\Phi$ can be directly obtained.

Since the above-described method can directly obtain the rotation angle, it is possible to greatly improve the accuracy as compared with the method for obtaining the rotation angle by integrating the angular velocity. However, the above-described method has the following problems.

Firstly, the resonance frequency in the x direction and the resonance frequency in the y direction are difficult to coincide with (match) each other. Specifically, even if the influence of manufacturing variation is compensated and temperature is changed, it is difficult to make the resonance frequencies coincide with each other. Secondly, the above-described scheme is established only in a period during which the movable body (mass) is in the free vibration. Since the free vibration is necessarily attenuated due to an energy loss such as a damping effect, it is difficult to perform the continuous measurement over a long period of time.

In the present embodiment, the above-described problems are solved in the following manner.

First of all, as a premise of the present embodiment, it is assumed that a value of ω is sufficiently large and r<<1 is satisfied. In addition, when a time t of the free vibration is small and the angle Φ is small, $$y(t) = -A\Phi \cos \omega t$$

is established.

Therefore, the angle Φ can be obtained by setting the movable body (mass) in the free vibration in the x direction and monitoring the amplitude in the y direction. When the time t is large, a nonlinear effect appears and therefore the amplitude is not proportional to Φ, but there is no problem if the amplitude is caught and ends to be monitored before it comes to such a state.

The equation of motion of the movable body 111 of the present embodiment can be expressed as follows.

$$\begin{pmatrix} m_x \ddot{x} \\ m_y \ddot{y} \end{pmatrix} + \begin{pmatrix} b_x \dot{x} \\ b_y \dot{y} \end{pmatrix} + K_M \begin{pmatrix} x \\ y \end{pmatrix} = \begin{pmatrix} 2m_x \Omega(t) \dot{y} \\ -2m_y \Omega(t) \dot{x} \end{pmatrix}$$

Where $m_x$ represents a mass of the movable body in the x direction and $m_y$ represents a mass of the movable body in the y direction. It should be noted that in the case of the structure in which the movable body in the x direction and the movable body in the y direction are integrated as shown in FIG. 3, $m_x = m_y$. In addition, $K_M$ is the following spring matrix.

$$K_M = \begin{pmatrix} k_{xx} & k_{xy} \\ k_{yx} & k_{yy} \end{pmatrix}$$

Although it is preferable that off-diagonal components $k_{xy}$ and $k_{yx}$ of the spring matrix are small, the off-diagonal components are usually not zero because they are affected by the manufacturing variation or the temperature dependence. In the following description, for simplicity, damping coefficients (attenuation coefficients) $b_x$ and $b_y$ are zero. If a Q value is large, an approximation thereof is reasonable. In addition, even when the $b_x$ and $b_y$ are not zero, the essence of the following discussion remains unchanged.

In FIG. 2, V1=V3 and V2=V4 and adjustment voltages V1 and V2 are applied to the adjustment mechanism 117. In this way, by applying the adjustment voltage to the adjustment mechanism 117, it is possible to change an effective spring constant by the electrostatic attraction. An amount of change in the effective spring constant by the electrostatic attraction is represented as follows.

$$K_E = \begin{pmatrix} 0 & p(V_1^2 - V_2^2) \\ p(V_1^2 - V_2^2) & q(V_1^2 + V_2^2) \end{pmatrix}$$

Where p and q are constants which depend on a dielectric constant, an inter-electrode gap, or the like [Yunfang Ni, Sensors 2014, 14, 20419-20438].

/$K_M$, /$K_E$, and /K are defined by the following formulas.

$$\overline{K} = \overline{K}_M + \overline{K}_E \equiv \begin{pmatrix} \mu^2 & (\kappa')^2 \\ \kappa^2 & \omega^2 \end{pmatrix}$$

$$\overline{K}_M = \begin{pmatrix} 1/m_x & 0 \\ 0 & 1/m_y \end{pmatrix} K_M$$

$$\overline{K}_E = \begin{pmatrix} 1/m_x & 0 \\ 0 & 1/m_y \end{pmatrix} K_E$$

Where μ is the angular resonance frequency in the x direction (drive direction), and ω is the angular resonance frequency in the y direction (sense direction). In this case, the equation of motion is represented by the following formula.

$$\begin{pmatrix} \ddot{x} \\ \ddot{y} \end{pmatrix} + \overline{K} \begin{pmatrix} 2\Omega(t)\dot{y} \\ -2\Omega(t)\dot{x} \end{pmatrix}$$

When a solution for the above equation of motion is obtained by perturbation (with respect to Ω and $\kappa^2$), the solution satisfying the above initial condition is as follows.

$$x(t) = A \cos \mu t$$

$$y(t) = 2A \frac{\mu}{\omega} \{I(t) \sin \omega t - J(t) \cos \omega t\}$$

Where $$I(t) = \int_0^t dt' \tilde{\Omega}(t') \sin(\mu t' - \phi_\kappa(t)) \cos \omega t'$$

$$J(t) = \int_0^t dt' \tilde{\Omega}(t') \sin(\mu t' - \phi_\kappa(t)) \sin \omega t'$$

$$\tilde{\Omega}(t) = \sqrt{\Omega(t)^2 + \frac{\kappa^2}{4\mu^2}}$$

$$\phi_\kappa(t) = \tan^{-1}\left[\frac{\kappa^2}{2\mu\Omega(t)}\right]$$

In case of μ~ω and κ~0, y is as the follows.

$$y(t) \approx -\alpha(\Delta f) A \tilde{\Phi}(t) \cos \omega t$$

Where $$\tilde{\Phi}(t) = \int_0^t dt' \tilde{\Omega}(t')$$

Δf is the difference between the resonance frequency in the x direction and the resonance frequency in the y direction. α(Δf) becomes a maximum value 1 if Δf=0 (μ=ω), and is a function quickly approaching zero if Δf deviates from zero. A specific form of α(Δf) is determined by Ω(t).

Figure 4:
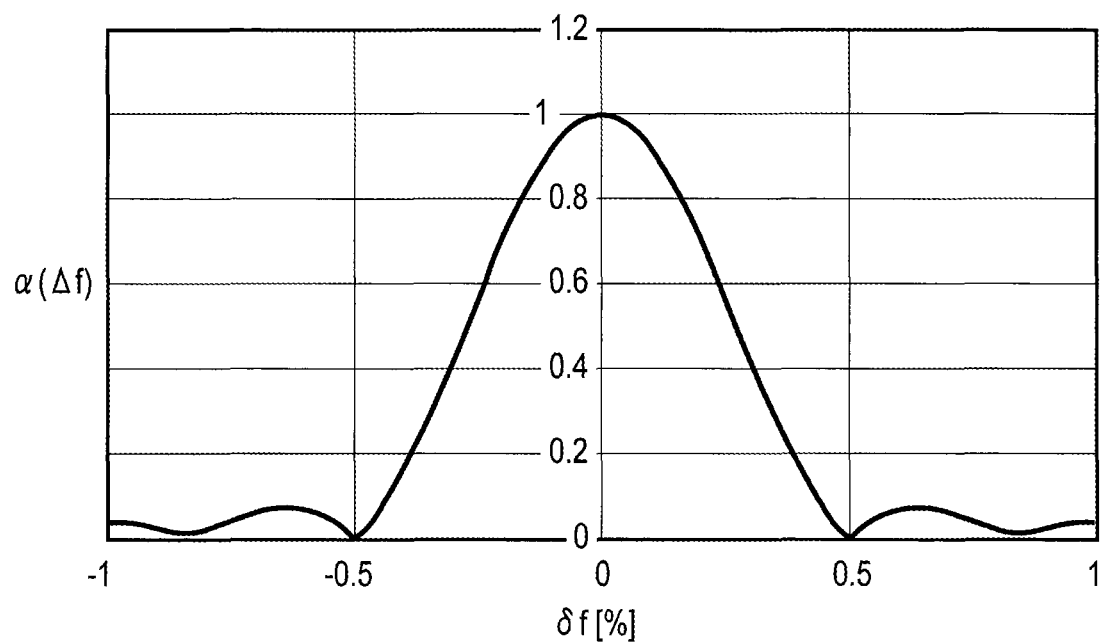
FIG. 4 is a diagram showing an example of $\alpha(\Delta f)$ according to an embodiment.

FIG. 4 is a diagram showing an example of $\alpha(\Delta f)$. Specifically, FIG. 4 shows an example in the case in which the angular velocity input is given only for a fixed period.

In case of $\mu=\omega$ and $\kappa^2=0$, y is as follows.

$y(t)=-A\Phi \cos \omega t$

This is the same form as the above-described Formula, which means that the angle $\Phi$ is obtained from the amplitude of the vibration in the y direction. In order to extract the angle $\Phi$, the vibration in the y direction is monitored, and a high frequency component (contribution of $\omega$) is reduced by a low pass filter. The angle $\Phi$ may have time dependence.

From the above, it can be seen that in order to calculate the angle $\Phi$ from the amplitude of the vibration in the y direction, there is a need to establish that $\mu=\omega$ and $\kappa^2=0$. This means that a matrix /K needs to be represented in the following form.

$$\overline{K} = \begin{pmatrix} \omega^2 & (\kappa'')^2 \\ 0 & \omega^2 \end{pmatrix} \equiv \overline{K}_J$$

It should be noted that $(\kappa'')^2$ need not be zero.

In the present embodiment, the matrix /K as described above is obtained by adjusting the voltages V1 and V2 to an appropriate voltage and changing a matrix $/K_E$. Since there are two parameters V1 and V2, it is possible to obtain the matrix /K as described above.

There is no need to extremely increase a symmetry of the structure of the movable portion (extremely increase the identity between the x-direction pattern and the y-direction pattern of the movable portion) by adopting the above-described method. Therefore, it is possible to manufacture the gyro sensor element at low cost by using the normal MEMS manufacturing process. In addition, it is possible to always maintain the matrix /K in the above form (/K=/$K_J$) by appropriately adjusting the voltages V1 and V2 even when the operating environment such as temperature is changed. That is, it is possible to adaptively adjust the matrix /K.

Next, a method for obtaining the above-mentioned condition (/K=/$K_J$) will be described. That is, a method for determining V1 and V2 will be described.

$$\frac{d\tilde{\Phi}(t)}{dt} = \sqrt{\Omega(t)^2 + \frac{\kappa^2}{4\mu^2}} \geq \Omega(t)$$

First of all, when the above formula is considered, $y(t)=A_m(t)\cos \omega t$ $A_m(t)=-\alpha(\Delta f)A\tilde{\Phi}(t)$ In the above formula, if V1 and V2 are determined so that a slope $(dA_m(t)/dt)$ of amplitude $A_m$ is minimized, $\kappa^2=0$ is established. In addition, if $\alpha(\Delta f)$ is maximized, $\Delta f=0$ ($\mu=\omega$). Therefore, if the V1 and V2 are determined so that the amplitude $A_m$ is maximized, the condition that $\Delta f=0$ ($\mu=\omega$) can be obtained.

From the above, it is important for the gyro sensor of the present embodiment to satisfy the following two conditions.

The first condition is that "$\mu=\omega$" is established. That is, the angular resonance frequency p of the vibration in the x direction of the movable body 111 and the angular resonance frequency $\omega$ of the vibration in the y direction of the movable body 111 coincide with each other (the first resonance frequency of the vibration in the x direction of the movable body 111 and the second resonance frequency of the vibration in the y direction of the movable body 111 coincide with each other). Specifically, the adjustment portion (the adjustment mechanism 117 and the adjustment signal generation circuit 130) adjusts the first resonance frequency and the second resonance frequency to coincide each other based on the amplitude of the vibration in the y direction of the movable body 111 that is detected by the detection portion (the detection mechanism 116 and the amplitude detection circuit 120). In addition, in order to establish such a condition, the amplitude $A_m$ of the vibration in the y direction of the movable body 111 is set to be maximized. Specifically, the adjustment signal generation circuit 130 generates the adjustment signal (the adjustment voltages V1 and V2) so that the amplitude $A_m$ of the vibration in the y direction of the movable body 111 is maximized.

The second condition is that "$\kappa^2=0$" is established. That is, in the spring matrix defining the vibration in the x and y directions of the movable body 111 by the spring mechanism 112, the component $\kappa^2$ defining the motion of the movable body 111 in the y direction among the off-diagonal components in the spring matrix is zero. Specifically, the adjustment signal generation circuit 130 generates the adjustment signal (adjustment voltages V1 and V2) so that the off-diagonal component $\kappa^2$ in the spring matrix is zero. In addition, to establish such conditions, the adjustment signal generation circuit 130 generates the adjustment signal (the adjustment voltages V1 and V2) so that a temporal variation in the amplitude $A_m$ of the vibration in the y direction of the movable body 111 is minimized. That is, the adjustment signal generation circuit 130 generates the adjustment signal so that the slope $(dA_m(t)/dt)$ of the amplitude $A_m$ is minimized.

Obtaining the V1 and V2 that satisfy the first condition ($\mu=\omega$) and obtaining the V1 and V2 that satisfy the second condition ($\kappa^2=0$) may be performed at the same time and may also be performed by shifting time. In case of shifting the time, in order not to destroy an optimum value first determined, the following conditions shall be satisfied.

In the case of determining the condition that satisfies $\mu=\omega$ after determining the condition satisfying $\kappa^2=0$, a value of $V_1^2-V_2^2$ is maintained to be a constant value (value first determined) while the V1 and V2 satisfying $\mu=\omega$ are searched. Meanwhile, in the case of determining the condition that satisfies $\kappa^2=0$ after determining the condition satisfying $\mu=\omega$, a value of $V_1^2+V_2^2$ is maintained to be a constant value (value first determined) while the V1 and V2 satisfying $\kappa^2=0$ are searched.

Next, timing at which the detection operation is performed by the detection portion (the detection mechanism 116 and the amplitude detection circuit 120) will be described.

As described above, the detection portion (the detection mechanism 116 and the amplitude detection circuit 120) performs the amplitude detection for performing the adjustment satisfying the above-described first and second conditions and the amplitude detection for performing the actual measurement (for acquiring the rotation angle). Basically, both the amplitude detection operation for adjustment and the amplitude detection operation for measurement are performed in the middle of a release period during which the movable body 111 is released from the catch and release mechanism 114 and thus is in the free vibration. Hereinafter, this will be described in detail.

Figure 5:
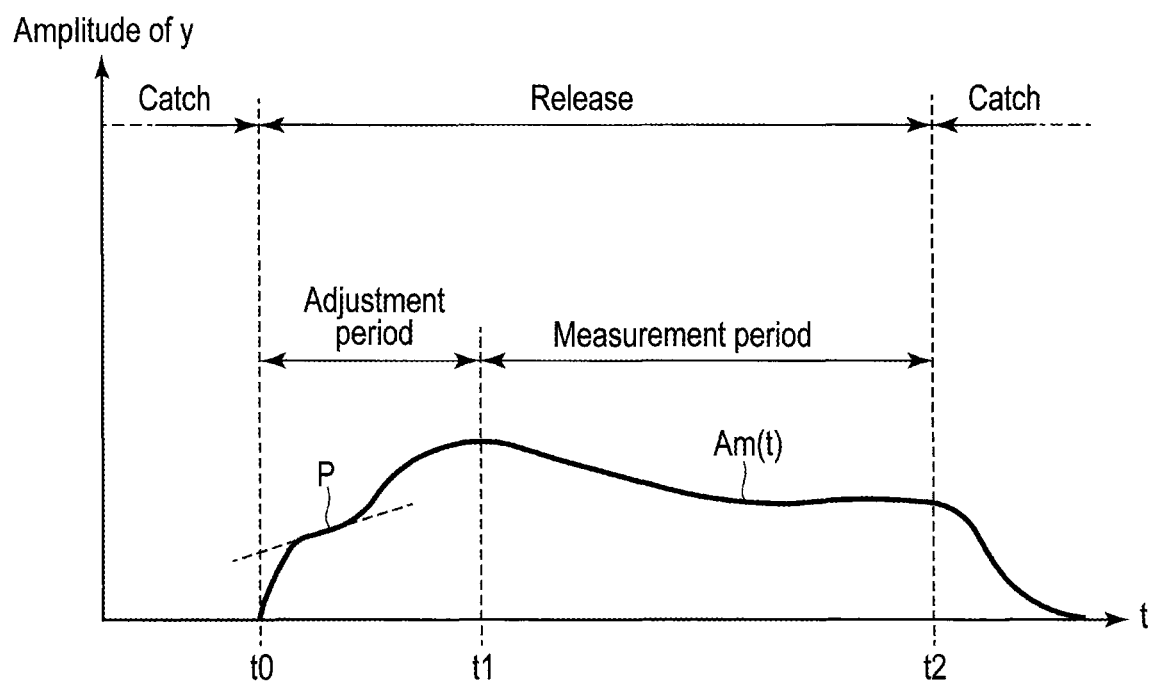
FIG. 5 is a diagram showing a first specific example of an amplitude detection operation for adjustment and an amplitude detection operation for measurement according to an embodiment.

FIG. 5 is a diagram showing a first specific example of an amplitude detection operation for adjustment and an amplitude detection operation for measurement. In this case, a catch period and the release period are repeated at a constant cycle, and the release period ranges from time t0 to t2. The same goes for even second to fourth specific examples shown in FIGS. 6 to 8.

In the first specific example, an adjustment period (t0 to t1) and a measurement period (t1 to t2) are separately provided in a release period (t0 to t2). In the adjustment period, the adjustment voltages V1 and V2 satisfying the first condition ($\mu=\omega$) and the second condition ($\kappa^2=0$) described above are simultaneously searched. In the measurement period, the adjustment operation is performed in the state in which the adjustment voltages (V1 and V2) determined during the adjustment period are maintained. It should be noted that point P is a point at which the slope ($dA_m(t)/dt$) of the amplitude $A_m$ in the y direction is minimized.

Figure 6:
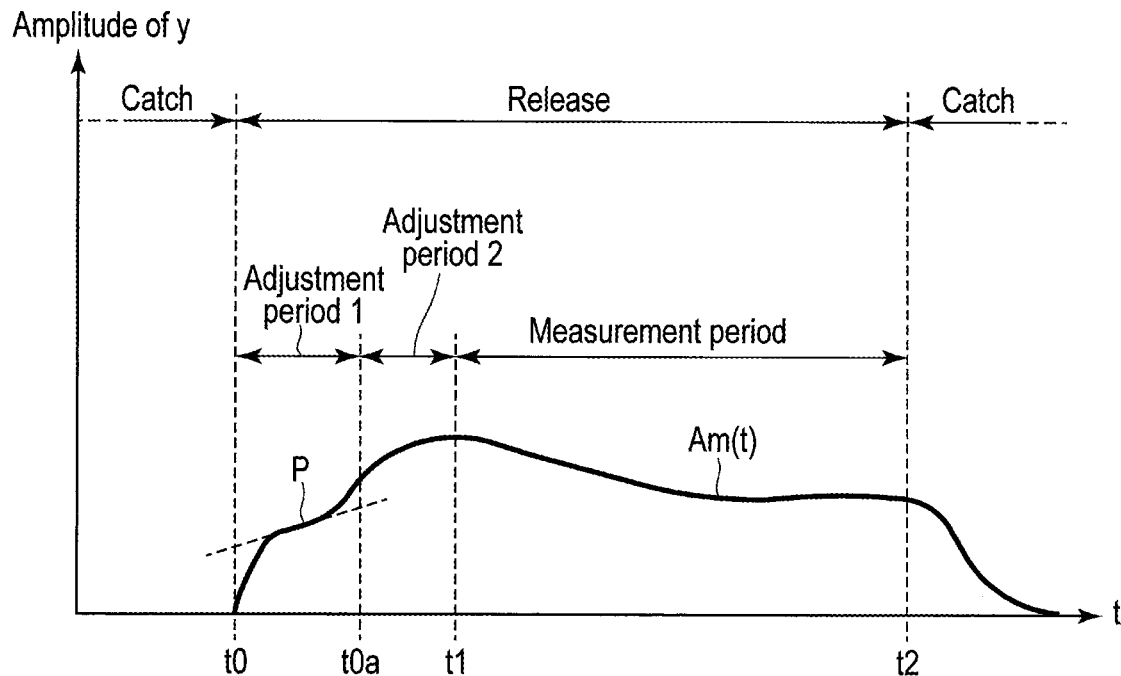
FIG. 6 is a diagram showing a second specific example of the amplitude detection operation for adjustment and the amplitude detection operation for measurement according to the embodiment.

FIG. 6 is a diagram showing a second specific example of the amplitude detection operation for adjustment and the amplitude detection operation for measurement.

Even in the second specific example, an adjustment period (t0 to t1) and a measurement period (t1 to t2) are separately provided in a release period (t0 to t2). However, in the present specific example, the adjustment period is divided into a first adjustment period (t0 to t0a) and a second adjustment period (t0a to t1). For example, the adjustment voltages (V1 and V2) satisfying the first condition ($\mu=\omega$) are searched in the first adjustment period, and the adjustment voltages (V1 and V2) satisfying the second condition ($\kappa^2=0$) are searched in the second adjustment period. Conversely, the adjustment voltages (V1 and V2) satisfying the second condition ($\kappa^2=0$) may be searched in the first adjustment period, and the adjustment voltages (V1 and V2) satisfying the first condition ($\mu=\omega$) may be searched in the second adjustment period. In the measurement period, the adjustment operation is performed in the state in which the adjustment voltages (V1 and V2) determined during the adjustment period are maintained.

Figure 7:
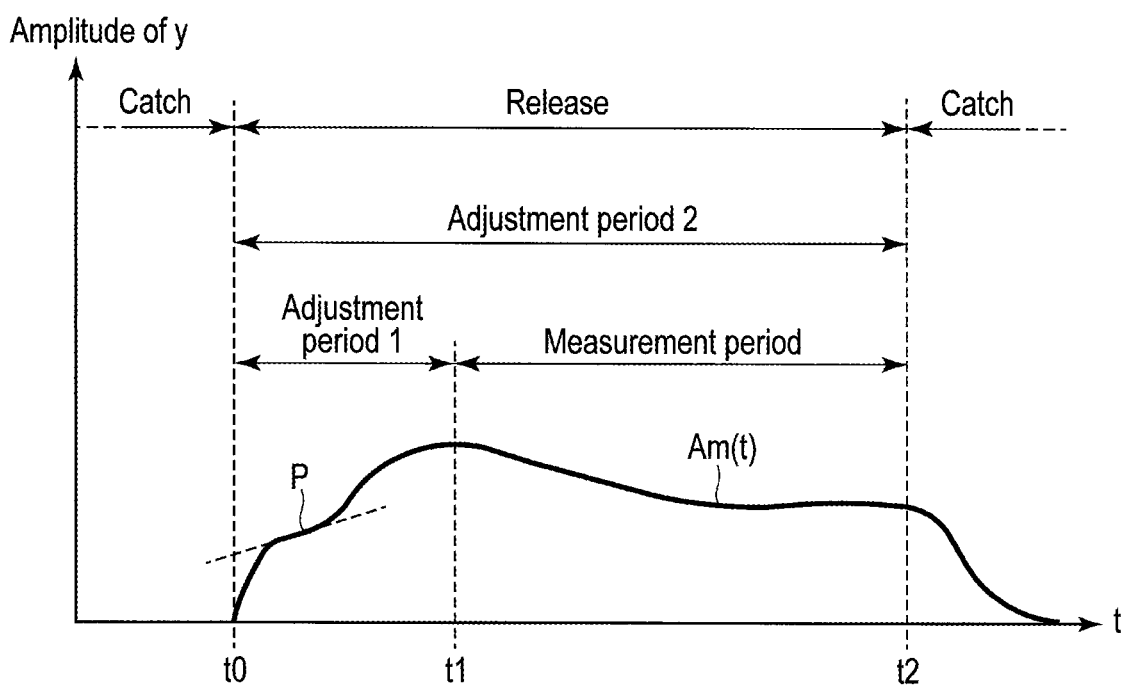
FIG. 7 is a diagram showing a third specific example of the amplitude detection operation for adjustment and the amplitude detection operation for measurement according to the embodiment.

FIG. 7 is a diagram showing a third specific example of the amplitude detection operation for adjustment and the amplitude detection operation for measurement.

In the third specific example, there are provided a first adjustment period (t0 to t1), a second adjustment period (t0 to t2), and a measurement period (t1 to t2). For example, the adjustment voltages (V1 and V2) satisfying the first condition ($\mu=\omega$) are searched in the first adjustment period, and the adjustment voltages (V1 and V2) satisfying the second condition ($\kappa^2=0$) are searched in the second adjustment period. Conversely, the adjustment voltages (V1 and V2) satisfying the second condition ($\kappa^2=0$) may be searched in the first adjustment period, and the adjustment voltages (V1 and V2) satisfying the first condition ($\mu=\omega$) may be searched in the second adjustment period. In the present specific example, the second adjustment period is provided even during the measurement period. For this reason, the adjustment operation is performed even in the middle of the measurement period. Therefore, when the optimum condition is changed during the measurement period, the method of the present specific example is effective.

Figure 8:
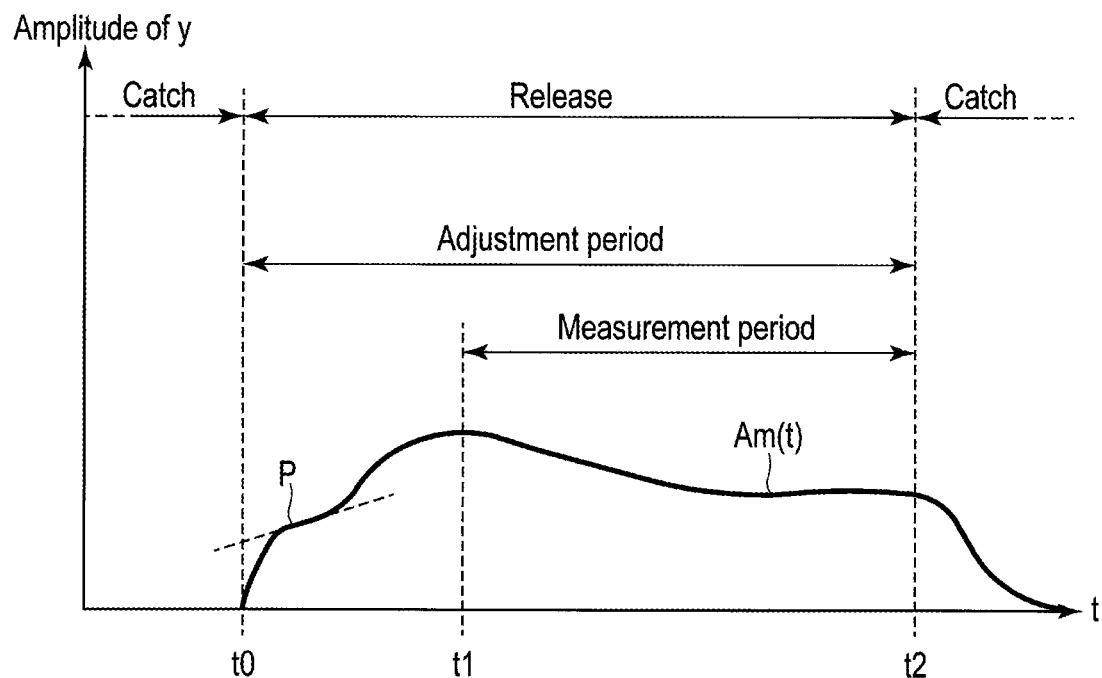
FIG. 8 is a diagram showing a fourth specific example of the amplitude detection operation for adjustment and the amplitude detection operation for measurement according to the embodiment.

FIG. 8 is a diagram showing a fourth specific example of the amplitude detection operation for adjustment and the amplitude detection operation for measurement.

In the fourth specific example, an adjustment period (t0 to t2) and a measurement period (t1 to t2) are provided. In the adjustment period, the adjustment voltages (V1 and V2) satisfying the first condition ($\mu=\omega$) and the second condition ($\kappa^2=0$) are simultaneously searched. In addition, in the present specific example, since the adjustment period is provided even during the measurement period, the adjustment operation is performed even in the middle of the measurement period. Therefore, when the optimum condition is changed during the measurement period, the method of the specific example is effective.

In the first to fourth specific examples described above, after the movable body 111 is caught by the catch and release mechanism 114, the vibration in the y direction of the movable body 111 may be forcibly attenuated. In the example shown in FIGS. 5 to 8, the amplitude of the vibration in the y direction is forcibly attenuated during a catch period after time t2. Such an operation can be realized by tuning the voltages V1 and V2 based on a force feedback that makes the amplitude $A_m$ in the y direction zero. In this way, it is possible to prevent the sense vibration in the y direction from continuing until a next release period starts by forcibly attenuating the vibration in the y direction. It should be noted that the forcible attenuation may be realized by a damping coefficient adjustment mechanism to be described later.

Next, a first modified example of the gyro sensor system according to the present embodiment will be described. It should be noted that since the basic matters are similar to those of the above embodiment, the description of the matters described in the above embodiment will be omitted.

Figure 9:
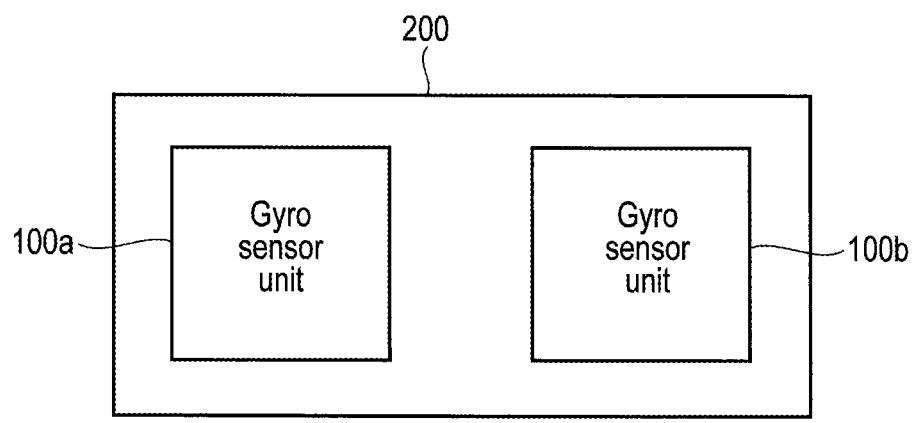
FIG. 9 is a diagram showing a basic configuration (concept) of a gyro sensor system according to a first modified example of the embodiment.

FIG. 9 is a diagram showing a basic configuration (concept) of a gyro sensor system according to the present modified example. In the present modified example, a gyro sensor system 200 includes two gyro sensor units 100a and 100b that have the same configuration as that of the gyro sensor unit 100 shown in FIG. 1.

Figure 10:
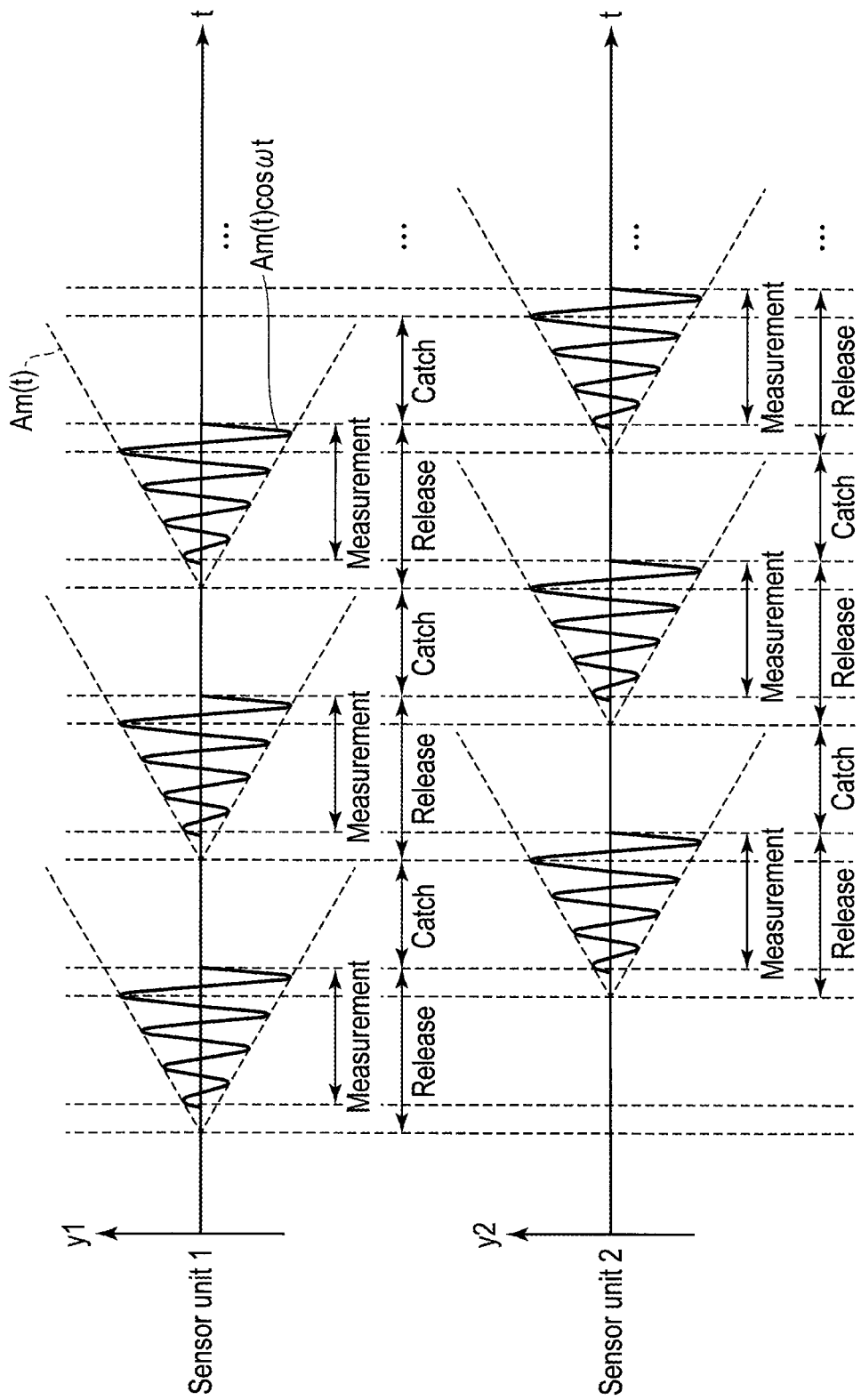
FIG. 10 is a diagram showing a basic operation of the gyro sensor system according to the first modified example of the embodiment.

FIG. 10 is a diagram showing a basic operation of the gyro sensor system according to the present modified example.

As shown in FIG. 10, each of the first gyro sensor unit 100a and the second gyro sensor unit 100b alternately has a release period during which a movable body 111 is in the free vibration in an x direction and a catch period during which the vibration of the movable body 111 is stopping. In addition, the release periods of the gyro sensor units 100a and 100b are sequentially and continuously generated. In other words, the release period of the gyro sensor unit 100a and the release period of the gyro sensor unit 100b are set to be complemented to each other.

In addition, in the present modified example, the release period of the first gyro sensor unit 100a and the release period of the second gyro sensor unit 100b overlap each other. In the overlap period, angle information of the first gyro sensor unit 100a and angle information of the second gyro sensor unit 100b may also match each other. In addition, the adjustment period as described above may be provided during the overlap period.

In the examples shown in FIGS. 9 and 10, the gyro sensor system 200 includes the two gyro sensor units 100a and 100b, but the gyro sensor system 200 may include three or more gyro sensor units 100.

In addition, the amplitude detection circuit 120, the adjustment signal generation circuit 130, and the rotation angle acquisition circuit 140 that are shown in FIG. 1 may be shared by a plurality of gyro sensor units 100 included in the gyro sensor system 200.

As described above, in the present modified example, the gyro sensor units 100 are provided, and each of the gyro sensor units 100 alternately has the release period during which the movable body 111 is in the free vibration in the x direction and the catch period during which the vibration of the movable body 111 is stopping, such that the release periods of the gyro sensor units 100 are sequentially and continuously generated. In this way, since the release period is continuously set, it is possible to perform the continuous measurement without interruption. By doing so, the detection accuracy of the rotation angle can be improved.

In addition, in the present modified example, the gyro sensor units 100 are provided, and therefore it is possible to shorten the release period of one gyro sensor unit 100. If it is assumed that the gyro sensor system 200 is constituted by a single gyro sensor unit 100, there is a need to set the release period of the single gyro sensor unit 100 to be long. When the angular velocity is constant, the amplitude of the vibration is monotonically increased, if the release period is set to be long, the amplitude becomes excessively large. In the present modified example, the release period of one gyro sensor unit 100 can be set to be short, such that it is possible to prevent such a problem. For example, if the angular velocity is set to be 1000 deg/sec, the movable body 111 is rotated by 1 deg at 1 ms and therefore is rotated by 10 deg at 10 ms. Therefore, the rotation range can be limited to a range in which a linear approximation of "sin Φ~Φ" can be established.

In the present modified example, it is preferable that the directions of the movable bodies 111 included in each of the gyro sensor units 100 are aligned with each other. That is, it is preferable that the x directions (first directions) in each of the gyro sensor units 100 are the same as each other and the y directions (second directions) in each of the gyro sensor units 100 are the same as each other. By adopting such a configuration, the drive vibrations by the gyro sensor units 100 become the same direction. For this reason, it is possible to prevent noise due to the drive vibration of the movable body 111 included in one gyro sensor unit 100 from adversely affecting the sensing operation of the other gyro sensor units 100.

Further, the gyro sensor units 100 may be provided in the same chip or may be provided in separate chips.

Next, various operation examples of the gyro sensor system 200 according to the present embodiment will be described.

FIG. 11 is a diagram showing a first operation example of the gyro sensor system 200 according to the present embodiment.

It should be noted that the present operation example can be mainly applied to the gyro sensor system shown in FIG. 9.

In the present operation example, when the amplitude of the vibration in the y direction of the movable body 111 of one gyro sensor unit 100 is increased to be larger than the predetermined value, the vibration in the x direction of the movable body 111 of the other gyro sensor unit 100 starts. FIG. 11 shows that when the amplitude of the vibration in the y direction of the movable body 111 of the first gyro sensor unit 100a becomes larger than a predetermined value (Amax), the vibration in the x direction of the movable body 111 of the second gyro sensor unit 100b starts. In addition, in the present operation example, after the overlap period has elapsed, one movable body 111 is caught to stop the vibration. By using the control method as in the present operation example, it is possible to prevent the amplitude of the vibration in the y direction of the movable body 111 from being excessively increased.

In addition, if a predetermined maximum release period has elapsed before the amplitude of the vibration in the y direction of one movable body 111 becomes larger than the predetermined value (Amax), the vibration in the x direction of the other movable body 111 starts after the predetermined maximum maximum release period has elapsed. That is, in the present operation example, if the release period during which the movable body is actually vibrating is TR, the predetermined maximum release period is TRmax, and the period until the amplitude of the vibration in the y direction of the movable body 111 reaches the predetermined value (Amax) is TAmax, then TR becomes the smaller of the TRmax and TAmax. That is, $$TR=\min\{TRmax, TAmax\}$$

FIG. 12 is a diagram showing a second operation example of the gyro sensor system 200 according to the present embodiment. It should be noted that the present operation example can be mainly applied to the gyro sensor system shown in FIGS. 1 and 9.

In the present operation example, when the amplitude of the vibration in the y direction of the movable body 111 is increased to be larger than the predetermined value, the amplitude detection for acquiring the rotation angle is performed. In FIG. 12, when the amplitude of the vibration in the y direction of the movable body 111 is increased to be larger than the predetermined value (Amin), the measurement period for acquiring the rotation angle starts. When the rotation angle is very small, the value of the angle Φ is almost zero and the amplitude $A_m$ is a very small value. When the amplitude $A_m$ approaches a noise level of the measurement system, the measurement accuracy deteriorates. In the present operation example, since the measurement period starts when the amplitude of the vibration in the y direction of the movable body 111 is larger than the predetermined value (Amin), it is possible to prevent the measurement accuracy from deteriorating.

In the present operation example, as described below, the amplitude of the vibration of the movable body 111 may be forcibly increased.

In the first method, in the adjustment period, the value of $\kappa^2$ is adjusted so that the amplitude of the vibration in the y direction of the movable body 111 becomes larger than the predetermined value (Amin). If $\kappa^2 > 0$, the following formula is established.

$$\tilde{\Phi}(t) > \Phi(t)$$

Therefore, it is obvious that the present method is possible. It should be noted that the condition of the voltages V1 and V2 at which $\kappa^2 = 0$ are found beforehand and stored in a register.

Figure 13:
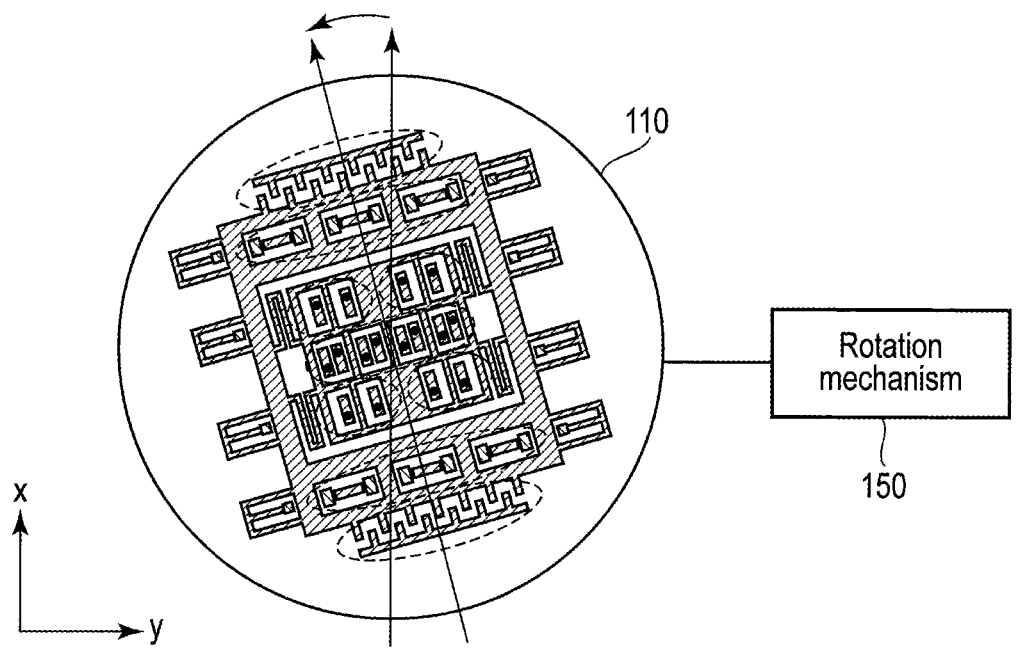
FIG. 13 is a diagram schematically showing a configuration used for a second method of the second operation example of the gyro sensor system according to the embodiment.

In the second method, as shown in FIG. 13, the rotation mechanism 150 is provided to forcibly rotate the gyro element 110. In this way, the amplitude of the vibration in the y direction of the movable body 111 becomes larger than the predetermined value (Amin) by forcibly rotating the gyro element 110 by the rotation mechanism 150.

Figure 14:
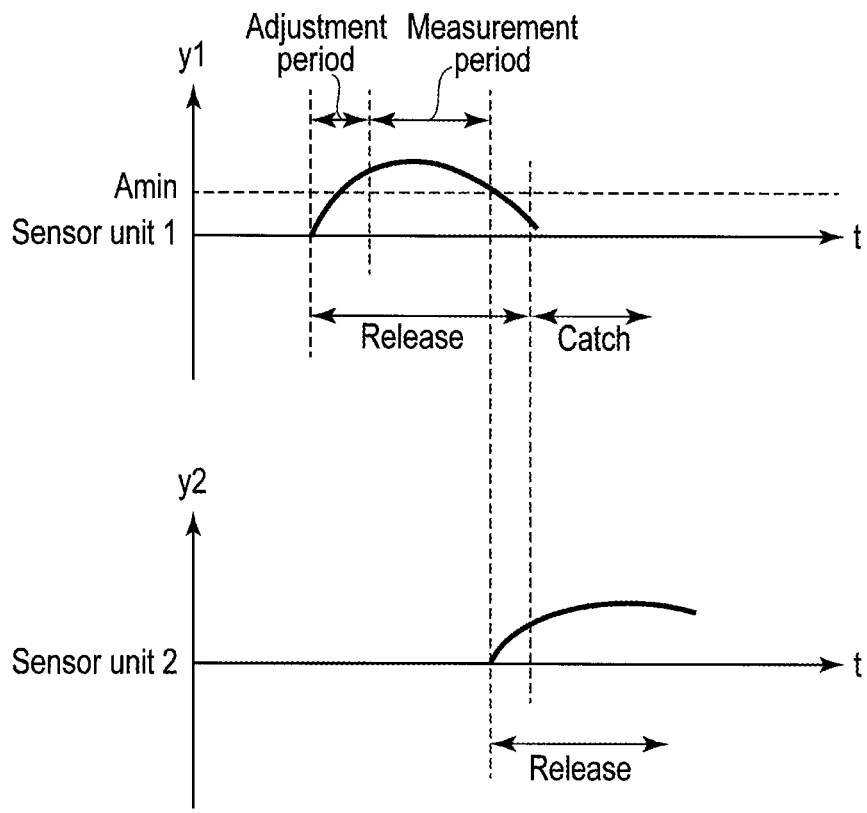
FIG. 14 is a diagram showing a third operation example of the gyro sensor system according to the embodiment.

FIG. 14 is a diagram showing a third operation example of the gyro sensor system 200 according to the present embodiment. It should be noted that the present operation example can be mainly applied to the gyro sensor system shown in FIG. 9.

In the present operation example, when the amplitude of the vibration in the y direction of the movable body 111 of one gyro sensor unit 100 is decreased to be smaller than the predetermined value, the vibration in the x direction of the movable body 111 of the other gyro sensor unit 100 starts. FIG. 14 shows the case in which when the amplitude of the vibration in the y direction of the movable body 111 of the first gyro sensor unit 100a becomes smaller than the predetermined value (Amin), the vibration in the x direction of the movable body 111 of the second gyro sensor unit 100b starts. In addition, in the present operation example, after the overlap period has elapsed, one movable body 111 is caught to stop the vibration. By using the control method as in the present operation example, the measurement can be prevented from being performed in a state in which the amplitude of the vibration in the y direction of the movable body 111 is excessively small, and thus the measurement accuracy can be prevented from being deteriorated.

In addition, if a predetermined maximum release period has elapsed before the amplitude of the vibration in the y direction of one movable body 111 becomes smaller than the predetermined value (Amin), the vibration in the x direction of the other movable body 111 starts after the predetermined maximum release period has elapsed. That is, in the present operation example, if the release period during which the movable body is actually vibrating is TR, the predetermined maximum release period is TRmax, and the period until the amplitude of the vibration in the y direction of the movable body 111 is smaller than the predetermined value (Amin) is TAmin, then TR becomes the smaller of the TRmax and TAmin. That is, $$TR=\min\{TR\max, TA\min\}$$

FIG. 15 is a diagram showing a fourth operation example of the gyro sensor system 200 according to the present embodiment. It should be noted that the present operation example can be mainly applied to the gyro sensor system shown in FIGS. 1 and 9.

In the present operation example, the amplitude $A_m$ of the vibration in the y direction is controlled to be constant with respect to the movable body 111 of the gyro sensor unit 100. Specifically, a feedback control is performed so that the amplitude of the vibration in the y direction is constant. By using such a control method, the sensing operation can be performed at the optimum amplitude level, such that it is possible to perform the measurement with high accuracy. It is should be noted that as a method for keeping an amplitude $A_m$ in a constant value, there are a method for adjusting a value of $K^2$, a method for using a rotation mechanism 150 as shown in FIG. 13, or the like. In the former method, it is possible to perform an inversion on the information on the angle Φ from the value of $K^2$ for keeping the amplitude $A_m$ in the constant value.

Next, a second modified example of the gyro sensor system according to the present embodiment will be described. It should be noted that since the basic matters are similar to those of the above embodiment, the description of the matters described in the above embodiment will be omitted.

FIG. 16 is a diagram showing a basic configuration (concept) of a gyro sensor system according to the present modified example. In the present modified example, a gyro sensor system 200 includes gyro sensor units 100a, 100b, and 100c. Both of the gyro sensor units 100a and 100b have the same configuration as the gyro sensor unit 100 shown in FIG. 1. That is, in the gyro sensor units 100a and 100b, the rotation angle of the movable body is directly acquired. The basic operation of the gyro sensor units 100a and 100b is the same as the operation of the first modified example shown in FIGS. 9 and 10. The second gyro sensor unit 100c acquires the angular velocity of the movable body included in the second gyro sensor unit.

It is possible to calculate the angular velocity Ω by differentiating the angle Φ acquired by the gyro sensor units 100a and 100b, but the second gyro sensor unit 100c can directly detect the angular velocity Ω to decrease the computation. It is also possible to improve the accuracy of both the angle Φ and the angular velocity Ω by acquiring both the angle Φ and the angular velocity Ω and by matching them.

It should be noted that a plurality of the second gyro sensor units may be provided or a triaxial gyro sensor may be used as the second gyro sensor unit.

Next, a third modified example of the gyro sensor system according to the present embodiment will be described. It should be noted that since the basic matters are similar to those of the above embodiment, the description of the matters described in the above embodiment will be omitted.

FIG. 17 is a diagram showing a basic configuration (concept) of a gyro sensor system according to the present modified example. In the present modified example, a gyro sensor system 200 includes three gyro sensor units 100x, 100y, and 100z. The gyro sensor unit 100x includes gyro sensor units 100ax and 100bx, the gyro sensor unit 100y includes gyro sensor units 100ay and 100by, and the gyro sensor unit 100z includes gyro sensor units 100az and 100bz. All of the gyro sensor units 100ax, 100bx, 100ay, 100by, 100az, and 100bz have the same configuration as the gyro sensor unit 100 shown in FIG. 1, and the rotation angle of the movable body is directly acquired. The basic operation of each of the gyro sensor units 100x, 100y, and 100z is the same as the first modified example shown in FIGS. 9 and 10.

The gyro sensor system according to the present modified example is used as a triaxial gyro sensor. That is, the gyro sensor unit 100x detects a rotation angle about an x axis as a rotation center, the gyro sensor unit 100y detects a rotation angle about a y axis as the rotation center, and the gyro sensor unit 100z detects a rotation angle about a z axis as the rotation center. In other words, in the three gyro sensor units 100x, 100y and 100z, the first directions defined in the above embodiments are perpendicular to each other, and the second directions defined in the above embodiments are perpendicular to each other.

In the present modified example, a triaxial gyro structure (for example, a pantograph type triaxial gyro structure) connected to each other may be adopted. In this case, a frequency fd of a drive vibration and frequencies fsx, fsy, and fsz of three sense vibrations may be equal to each other. That is, it may be set to be fd=fsx=fsy=fsz.

In the above embodiment, when the damping coefficients (attenuation coefficients) $b_x$ and $b_y$ are not zero, each of the amplitudes in the x direction and the y direction is attenuated based on exp $(-b_x t/2)$ and exp $(-b_y t/2)$. When the angle information and the angular velocity information are acquired, such the attenuation effect may be corrected. For example, if the correction is performed on the measurement value $y_{obs}$ of the amplitude in the y direction as follows, $$y_{obs}(t) \rightarrow e^{b_y t/2} y_{obs}(t) \equiv y_c(t),$$

a value yc(t) from which the attenuation influence is removed can be obtained. In addition, in the above embodiment, it is known that an angle drift occurs if an asymmetry of the damping coefficients (attenuation coefficients) $b_x$ and $b_y$ exists [Igor P. Prikhodko, et. al., "Foucault pendulum on a chip: Rate integrating silicon MEMS gyroscope", Sensors and Actuators A 177 (2012) 67-78]. Therefore, in order to suppress the angle drift, a damping coefficient adjustment mechanism may be provided as below.

Figure 18:
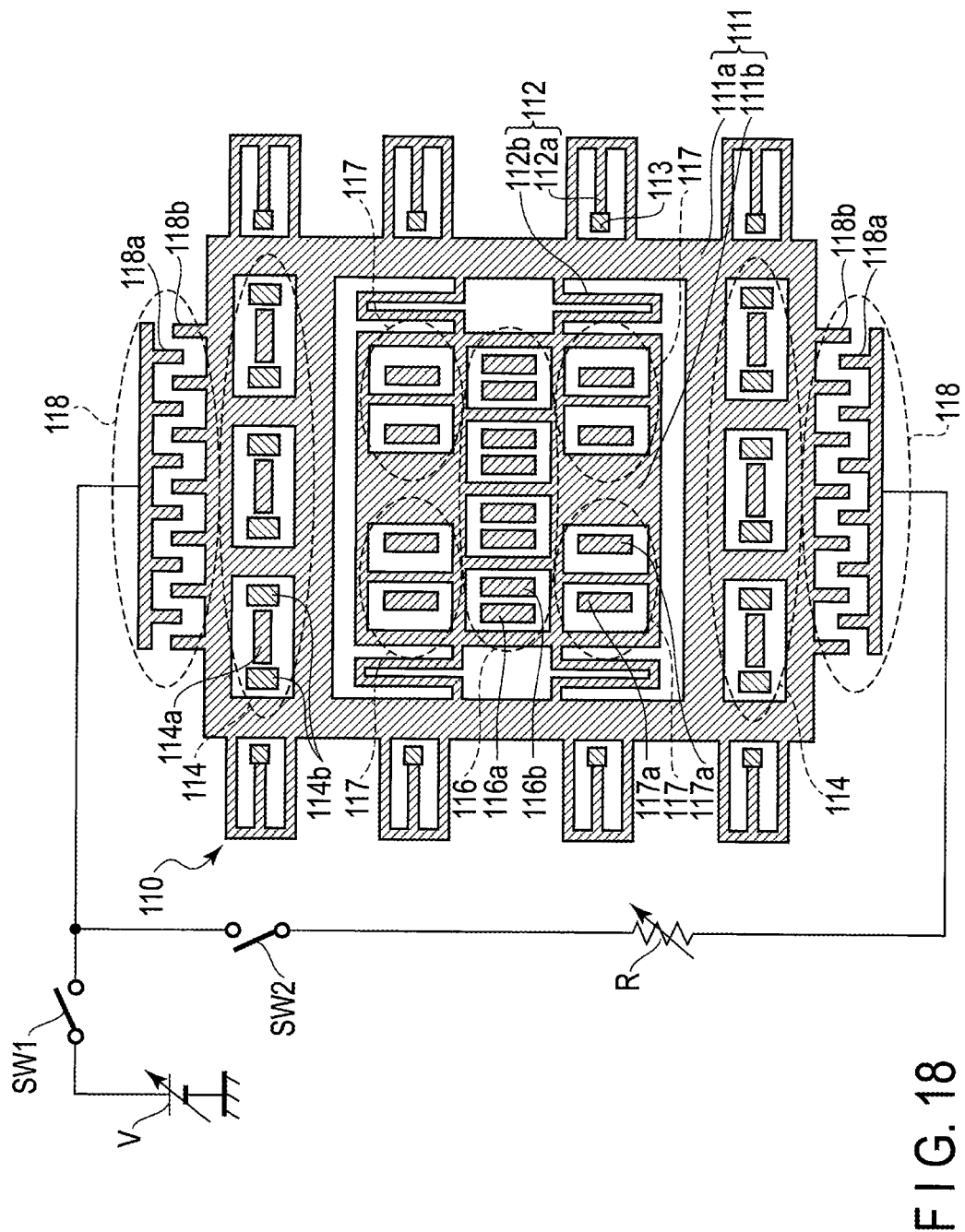
FIG. 18 is a diagram schematically showing a first configuration example of a gyro sensor system having a damping coefficient adjustment mechanism according to an embodiment.

FIG. 18 is a diagram schematically showing a first configuration example of a gyro sensor system having a damping coefficient adjustment mechanism.

In the first configuration example, one variable capacitor 118 (electrode pair 118a and 118b) having capacitance C1 and the other variable capacitor 118 (electrode pair 118a and 118b) having capacitance C2 can be connected to each other via a variable resistor R. The variable voltage V can be supplied to the two variable capacitors 118 via a switch SW1. If both of the switch SW1 and a switch SW2 are turned on to charge the two variable capacitors 118 with the variable voltage V and then only the switch SW1 is turned off, the two variable capacitors 118 are connected to each other via the variable resistor R. If the movable body (mass) 111 is displaced, the capacitances C1 and C2 are changed, charges accumulated in the variable capacitor 118 move through the variable resistor R. As a result, the variable resistor R generates heat energy and serves as the damping.

The capacitances C1 and C2 can be represented by as follows using a position x of the movable body 111.

$C_1 = \alpha + \beta x$ $C_2 = \alpha - \beta x$

If the switch SW1 is turned off and then movable body 111 is displaced by $\Delta x$ during a period of $\Delta t$, the moving charge amount is as follows.

$\Delta Q = \Delta C_1 V = \beta \Delta x V$

At this time, the energy consumed by the variable resistor R is as follows.

$$\Delta W = \left(\frac{\Delta Q}{\Delta t}\right)^2 R \Delta t = \beta^2 V^2 R \frac{\Delta x}{\Delta t} \Delta x$$

Therefore, a damping force by the variable resistor R is as follows.

$$F = \frac{\Delta W}{\Delta x} = \beta^2 V^2 R \frac{\Delta x}{\Delta t}$$

This means that the damping force having the damping coefficient $b_R = \beta^2 V^2 R$ acts. This damping coefficient can be changed by the variable voltage V and the variable resistor R. Therefore, it is possible to eliminate the asymmetry of the damping coefficient by adjusting the values of the variable voltage V and the variable resistor R.

It should be noted that there is a relationship of $\tau = 2 m/b$ between the damping coefficient b and a damping time constant $\tau$, where m is the mass of the movable portion. Therefore, adjusting the damping coefficient b is the same as adjusting the damping time constant $\tau$.

Figure 19:
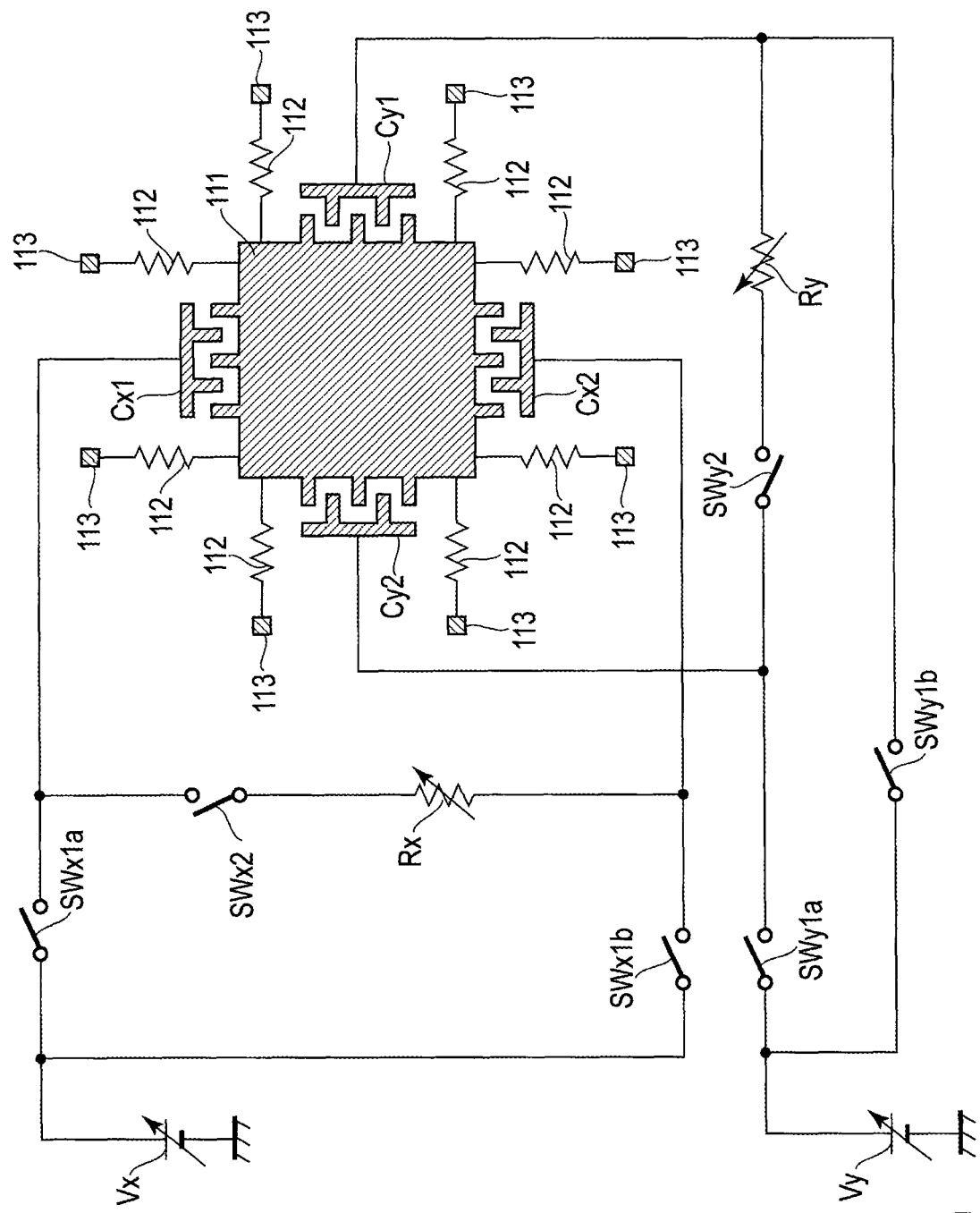
FIG. 19 is a diagram schematically showing a second configuration example of the gyro sensor system having the damping coefficient adjustment mechanism according to the embodiment.

FIG. 19 is a diagram schematically showing a second configuration example of the gyro sensor system having the damping coefficient adjustment mechanism.

In the second configuration example, the damping coefficient adjustment mechanism is adopted even for both the x direction and the y direction. If either a switch SWx2 or a switch SWy2 is turned off, the damping influence due to the variable resistor can be eliminated. By doing so, for example, it is possible to suppress unnecessary vibrations from occurring by operating the damping mechanism only during the catch period. Specifically, in the release period during which the measurement is performed, switches SWx1a, SWx1b, SWy1a, and SWy1b are in a turned on state and switches SWx2 and SWy2 are in a turned off state. During the catch period, the switches SWx1a, SWx1b, SWy1a, and SWy1b are in a turned off state and the switches SWx2 and SWy2 are in a turned on state. In order to suppress unnecessary vibrations from occurring immediately after the release period, the same switch state as the switch state during the catch period may be continued in a fixed period after the release period.

Figure 20:
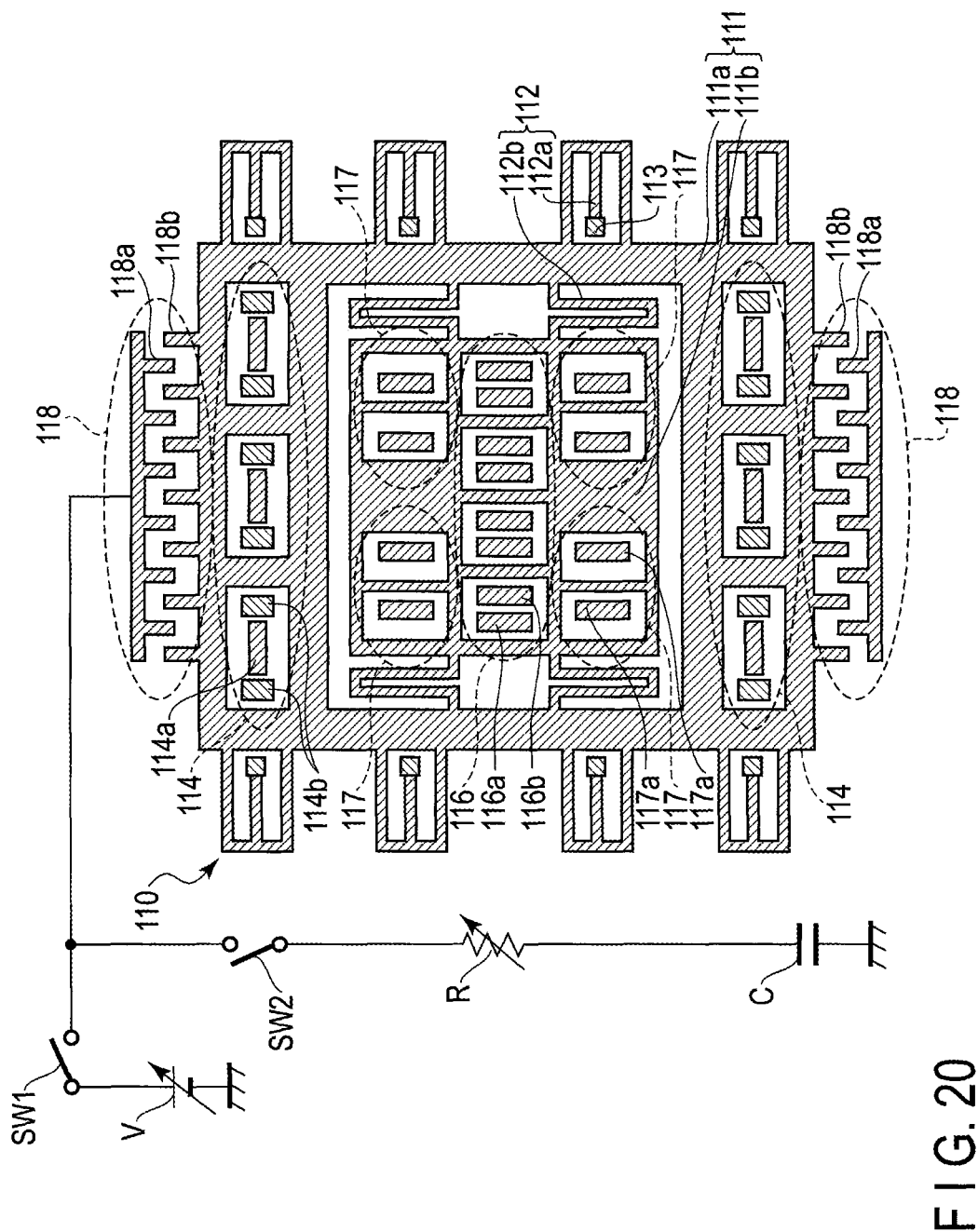
FIG. 20 is a diagram schematically showing a third configuration example of the gyro sensor system having the damping coefficient adjustment mechanism according to the embodiment.

FIG. 20 is a diagram schematically showing a third configuration example of the gyro sensor system having the damping coefficient adjustment mechanism.

In the third configuration example, the variable resistor R is connected to a capacitor C having a fixed capacitance. That is, the variable resistor R is connected between a variable capacitor 118 whose capacitance is changed according to a displacement of the movable body 111 and the capacitor C having the fixed capacitance. When the movable body 111 is displaced, a part of the charges accumulated in the variable capacitor 118 passes through the variable resistor R. Due to the energy loss at this time, the damping coefficient of the movable body 111 is adjusted.

It should be noted that a fixed resistor may be adopted instead of the variable resistor and the damping coefficient may be adjusted only by the variable voltage V. In this case, the variable capacitor is connected to a variable voltage source via the switch, and the accumulated charge amount of the variable capacitor is controlled by adjusting a voltage value of the variable voltage source. By doing so, it is possible to adjust the damping coefficient.

In the above embodiments, the amplitude of vibration of the movable body in the second direction is detected to acquire the rotation angle of the movable body, however the amplitudes of vibrations of the movable body in the first and second directions may be detected to acquire the rotation angle of the movable body.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gyro sensor system comprising at least one gyro sensor unit comprising:
   a movable body;
   a spring mechanism configured to vibrate the movable body;
   a detector capable of detecting an amplitude of vibration of the movable body wherein the vibration is due to a Coriolis force acting on the movable body;
   an adjuster configured to adjust a first resonance frequency of vibration of the movable body in free vibration and a second resonance frequency of vibration of the movable body wherein the vibration is due to the Coriolis force acting on the movable body, so that the first resonance frequency and the second resonance frequency coincide with each other, based on the amplitude of the vibration due to the Coriolis force detected by the detector; and
   a rotation angle acquisition unit configured to acquire a rotation angle of the movable body, based on the amplitude of the vibration due to the Coriolis force detected by the detector in a state in which the first resonance frequency and the second resonance frequency are adjusted by the adjuster so that the first resonance frequency and the second resonance frequency coincide with each other, wherein the adjuster comprises:
an adjustment signal generation circuit configured to generate an adjustment signal to coincide the first resonance frequency and the second resonance frequency with each other, based on the amplitude of the vibration due to the Coriolis force detected by the detector; and
an adjustment mechanism configured to receive the adjustment signal generated from the adjustment signal generation circuit to perform the adjustment of the movable body.

2. The gyro sensor system of claim 1, wherein the adjustment signal generation circuit generates the adjustment signal so that the amplitude of the vibration due to the Coriolis force detected by the detector is maximized.

3. The gyro sensor system of claim 1, wherein the adjustment signal generation circuit generates the adjustment signal so that a temporal change in the amplitude of the vibration due to the Coriolis force detected by the detector is minimized.

4. The gyro sensor system of claim 1, wherein when the movable body is rotated by 90° with respect to an axis that is perpendicular to a direction of the vibration due to the free vibration and a direction of the vibration due to the Coriolis force and that passes through a center of a pattern of the movable body, the pattern of the movable body is not rotationally symmetric.

5. The gyro sensor system of claim 1, wherein the gyro sensor unit further comprises a catch and release mechanism configured to catch the movable body and release the caught movable body so that the movable body is in the free vibration.

6. The gyro sensor system of claim 5, wherein the detector performs a detection of the amplitude for performing the adjustment and a detection of the amplitude for acquiring the rotation angle in a period during which the movable body freely vibrates by being released from the catch and release mechanism.

7. The gyro sensor system of claim 5, wherein the vibration due to the Coriolis force is forcibly attenuated after the movable body is caught by the catch and release mechanism.

8. The gyro sensor system of claim 1, wherein when the amplitude of the vibration due to the Coriolis force is increased to be larger than a predetermined value, the detection of the amplitude for acquiring the rotation angle is performed.

9. The gyro sensor system of claim 1, wherein the movable body is controlled so that the amplitude of the vibration due to the Coriolis force is constant.

10. The gyro sensor system of claim 1, wherein the at least one gyro sensor unit comprises first and second gyro sensor units.

11. The gyro sensor system of claim 1, wherein the at least one gyro sensor unit comprises three gyro sensor units, and the three gyro sensor units are respectively sensitive about three respective axes that are all perpendicular to each other.

12. A gyro sensor system comprising a sensor unit comprising:
a movable body;
a spring mechanism configured to vibrate the movable body;
a detector capable of detecting an amplitude of vibration of the movable body wherein the vibration is due to a Coriolis force acting on the movable body;
an adjuster configured to adjust a first resonance frequency of vibration of the movable body in free vibration and a second resonance frequency of vibration of the movable body wherein the vibration is due to the Coriolis force acting on the movable body, so that the first resonance frequency and the second resonance frequency coincide with each other, based on the amplitude of the vibration due to the Coriolis force detected by the detector; and
a rotation angle acquisition unit configured to acquire a rotation angle of the movable body, based on the amplitude of the vibration due to the Coriolis force detected by the detector in a state in which the first resonance frequency and the second resonance frequency are adjusted by the adjuster so that the first resonance frequency and the second resonance frequency coincide with each other; and
a damping coefficient adjustment mechanism comprising a variable capacitor whose capacitance is changed by a displacement of the movable body, and a resistor connected to the variable capacitor,
wherein the damping coefficient adjustment mechanism adjusts a damping coefficient of the movable body based on an energy loss occurring when a part of electric charges accumulated in the variable capacitor passes through the resistor by the displacement of the movable body.

13. The gyro sensor system of claim 12, wherein the damping coefficient adjustment mechanism further includes a variable voltage source and a switch connected between the variable capacitor and the variable voltage source, and
an accumulated charge amount of the variable capacitor is controlled by adjusting a voltage of the variable voltage source.

* * * * *